United States Patent
Klish, II

(10) Patent No.: US 12,192,102 B2
(45) Date of Patent: Jan. 7, 2025

(54) SYSTEM AND METHOD FOR TRANSPORT OVERHEAD AND HEADER FIELD CYBERSECURITY

(71) Applicant: Eagle Technology, LLC, Melbourne, FL (US)

(72) Inventor: Cypryan T. Klish, II, Melbourne, FL (US)

(73) Assignee: Eagle Technology, LLC, Melbourne, FL (US)

( * ) Notice: Subject to any disclaimer, the term of this patent is extended or adjusted under 35 U.S.C. 154(b) by 464 days.

(21) Appl. No.: 17/586,628

(22) Filed: Jan. 27, 2022

(65) Prior Publication Data

US 2023/0261992 A1  Aug. 17, 2023

(51) Int. Cl.
*H04L 45/74* (2022.01)
*H04L 9/40* (2022.01)
*H04L 47/12* (2022.01)

(52) U.S. Cl.
CPC .............. *H04L 45/74* (2013.01); *H04L 47/12* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 7,187,650 B2 | 3/2007 | Xiong et al. | |
| 7,304,952 B2 | 12/2007 | Scholten | |
| 7,519,080 B2 | 4/2009 | Xiong et al. | |
| 7,630,405 B1 | 12/2009 | Gao et al. | |
| 7,653,083 B2 | 1/2010 | Liu et al. | |
| 7,656,897 B2 | 2/2010 | Liu | |
| 7,672,330 B2 | 3/2010 | Huang | |
| 7,680,149 B2 | 3/2010 | Liu et al. | |
| 7,792,044 B2 | 9/2010 | Holness et al. | |
| 7,817,603 B2 | 10/2010 | Liu | |
| 7,822,075 B2 | 10/2010 | Liu | |
| 8,102,876 B2 | 1/2012 | McGuire | |

(Continued)

OTHER PUBLICATIONS

ITU-T G.874—Telecommunication Standardization Sector of ITU "Series G: Transmission Systems and Media, Digital Systems and Networks Digital networks—Optical transport networks—Management aspects of optical transport network elements " (Oct. 2020).

(Continued)

*Primary Examiner* — Jay L Vogel
(74) *Attorney, Agent, or Firm* — Fox Rothschild LLP; Carol Thorstad-Forsyth

(57) ABSTRACT

Systems and methods for improving network element security. The methods comprise: obtaining a transport frame by the network element; analyzing, by the network element, the transport frame to determine whether or not any vulnerable overhead field values in at least one of a header of a mapping layer frame and a header of a transport layer frame have values other than expected values; modifying, by the network element, at least one reserved target field value in the transport frame when a determination is made that the at least one vulnerable overhead field value has a value other than the expected value; and communicating, by the network element, the transport frame with the modified at least one reserved target value over a network.

16 Claims, 16 Drawing Sheets

(56) References Cited

U.S. PATENT DOCUMENTS

| | | | |
|---|---|---|---|
| 8,155,147 B2 | 4/2012 | Gao et al. | |
| 8,238,373 B2 | 8/2012 | Jiang | |
| 8,296,630 B2 | 10/2012 | Garcia et al. | |
| 8,369,226 B2 | 2/2013 | Peng et al. | |
| 8,392,788 B2 | 3/2013 | Calderon et al. | |
| 8,406,636 B2 | 3/2013 | Zou | |
| 8,514,897 B2 | 8/2013 | Jiang | |
| 8,615,022 B2 | 12/2013 | Harrison et al. | |
| 8,824,504 B2 | 9/2014 | Zou | |
| 9,054,824 B2 | 6/2015 | Tateno | |
| 9,077,560 B2 | 7/2015 | Harrison et al. | |
| 9,344,321 B1 | 5/2016 | Gorshe | |
| 9,374,265 B1* | 6/2016 | Mok | H04L 69/22 |
| 9,736,275 B1 | 8/2017 | Gorshe | |
| 10,097,480 B2 | 10/2018 | Gareau et al. | |
| 10,306,027 B2 | 5/2019 | Gorshe | |
| 10,601,514 B2 | 3/2020 | Su et al. | |
| 10,673,782 B2 | 6/2020 | Gareau et al. | |
| 10,771,177 B2 | 9/2020 | Su | |
| 10,771,178 B2 | 9/2020 | Su et al. | |
| 2009/0161676 A1* | 6/2009 | Breau | H04L 63/0263 |
| | | | 370/392 |
| 2010/0287613 A1* | 11/2010 | Singh | H04L 63/166 |
| | | | 726/22 |
| 2017/0201318 A1* | 7/2017 | Yazar | H04B 10/03 |
| 2019/0166144 A1* | 5/2019 | Mirsky | G06N 20/20 |
| 2021/0320929 A1* | 10/2021 | Xie | H04L 69/22 |
| 2022/0394034 A1* | 12/2022 | Keith | G06F 9/547 |

OTHER PUBLICATIONS

ITU-T G.798.1—Telecommunication Standardization Sector of ITU "Series G: Transmission Systems and Media, Digital Systems and Networks—Digital Terminal Equipments—Other Terminal Equipment Types And Characteristics Of Optical Transport Network Equipment".

ITU-T G.798—Telecommunication Standardization Sector of ITU Corrigendum 2 Series G: Transmission Systems and Media, Digital Systems and Networks (May 2021)—"Digital terminal equipments—Other terminal equipment Characteristics of Optical Transport Network Hierarchy Equipment Functional Blocks Corrigendum 2 Recommendation" (2017).

ITU-T G G.709.4/Y.1331.4—Telecommunication Standardization Sector of ITU Series G: Transmission Systems and Media, Digital Systems and Networks "Digital Terminal Equipments—General Series Y: Global Information Infrastructure, Internet Protocol Aspects, Next-Generation Networks, Internet Of Things And Smart Cities Internet Protocol Aspects—Transport—Otu25 And Otu50 Short-Reach Interfaces".

ITU-T G.709.3/Y.1331.3—Telecommunication Standardization Sector of ITU "Erratum 1 (Jun. 2021) to ITU-T Recommendation (Dec. 2020), Flexible OTN long-reach interfaces".

G.709.2/Y.1331.2—Telecommunication Standardization Sector of ITU Corrigendum 1 (Sep. 2020) Series G: Transmission Systems and Media, Digital Systems and Networks Digital terminal equipments—General Series Y: Global Information Infrastructure, Internet Protocol Aspects, Next-Generation Networks, Internet of Things and Smart Cities—Internet protocol aspects—Transport OTU4 long-reach interface Corrigendum 1.

ITU-T G.709.1/Y.1331.1—Telecommunication Standardization Sector of ITU Amendment 2 (Dec. 2020) Series G: Transmission Systems and Media, Digital Systems and Networks Digital terminal equipments—General Series Y: Global Information Infrastructure, Internet Protocol Aspects, Next-Generation Networks, Internet of Things and Smart Cities Internet protocol aspects—Transport Flexible OTN short-reach interfaces Amendment 2.

ITU-T G.709/Y.1331—Telecommunication Standardization Sector of ITU Series G: Transmission Systems and Media, Digital Systems and Networks—Digital terminal equipments—General Series Y: Global Information Infrastructure, Internet Protocol Aspects, Next-Generation Networks, Internet of Things and Smart Cities Internet protocol aspects—Transport Interfaces for the optical transport network Corrigendum 1.

ITU-T G.872—Telecommunication Standardization Sector—Subject: Erratum 1 (Jan. 2021) to Recommendation ITU-T G.872 (Dec. 2019): "Architecture of optical transport networks" to "Architecture of the optical transport network".

ITU-T G.872—Telecommunication Standardization Sector of ITU Amendment 1 (Jan. 2021) Series G: Transmission Systems and Media, Digital Systems and Networks Digital networks—Optical transport networks Architecture of the optical transport network Amendment 1.

ITU-T G.870/Y.1352—Telecommunication Standardization Sector of ITU (Nov. 2016) Series G: Transmission Systems and Media, Digital Systems and Networks—Digital networks—Optical transport networks Series Y: Global Information Infrastructure, Internet Protocol Aspects, Next-Generation Networks, Internet of Things and Smart Cities Internet protocol aspects—Transport Terms and definitions for optical transport networks.

American National Standard for Telecommunications—Generic Framing Procedure—Secretariat: Alliance for Telecommunications Industry Solutions.

* cited by examiner

GFP relationship to client signals and transport paths

GFP function model (single client)

From a start of frame, the index is the count of octet to the target octets, including the target octet

Primitive Index Type OH 1 (TO1)

Compound Index Case 1

Index 2 (TO2)

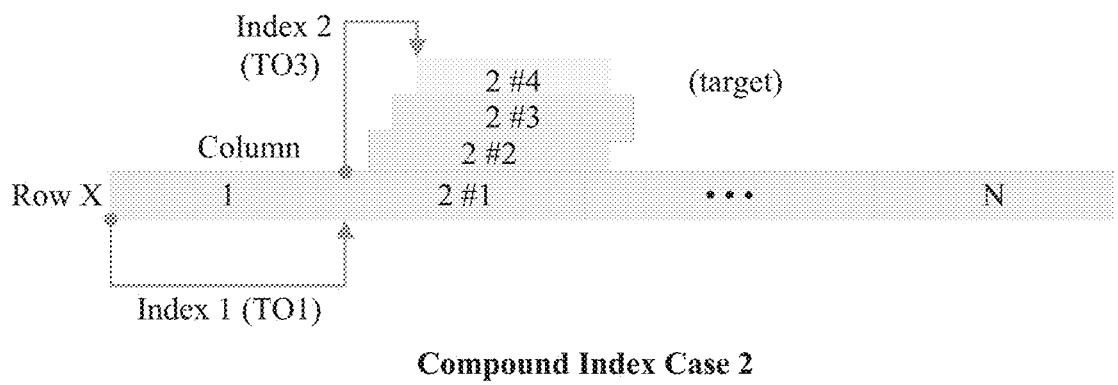
Compound Index Case 2
FIG. 18
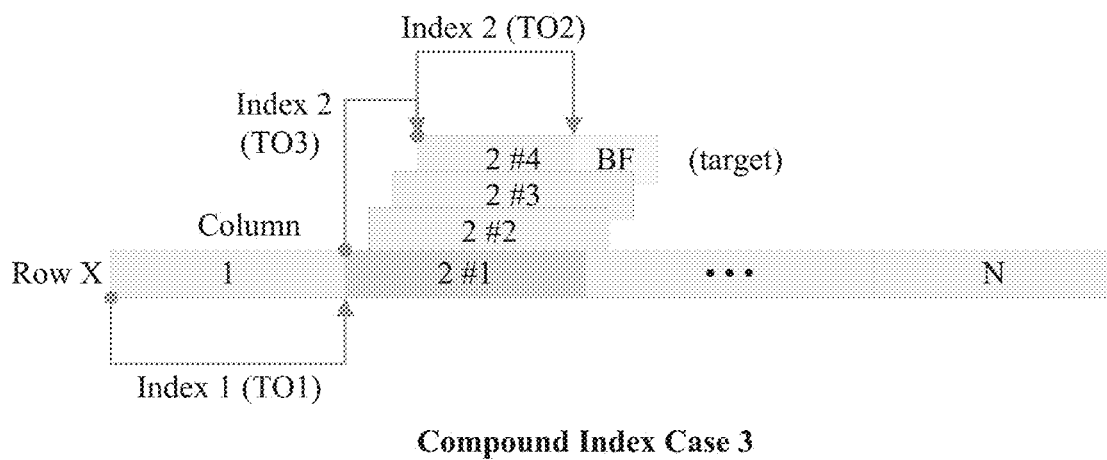
Compound Index Case 3
FIG. 19
| Target Type | TO1 | TO2 | TO3 |
|---|---|---|---|
| Octet | TO1 | N/A | N/A |
| Octet Bit Field | TO1 | TO2 | N/A |
| Instance Octet | TO1 | N/A | TO3 |
| Instance Octet Bit Field | TO1 | TO2 | TO3 |
OH Type Usage vs. Target Type
FIG. 20

SYSTEM AND METHOD FOR TRANSPORT OVERHEAD AND HEADER FIELD CYBERSECURITY

STATEMENT OF THE TECHNICAL FIELD

The present document concerns computing systems. More particularly, the present document concerns systems and methods for cybersecurity.

BACKGROUND

Description of the Related Art

There are many client technologies that can be mapped to a transport network using a framing protocol. Ethernet is one of these client technologies. Ethernet has been used to facilitate data transfer, internet access and video conferencing. Ethernet is used in Local Area Networks (LANs), Metropolitan Area Networks (MANs) and Wide Area Networks (WANs). A mechanism is required for mapping Ethernet network signals and other network client signal types for traffic transportation. This mechanism employs a framing and/or mapping procedure that facilitates the transport of client signal traffic within transport network framing structures. The mechanism can include an Optical Transport Network (OTN), a Synchronous Optical Network (SONET), or a Synchronous Digital Hierarchy (SDH) network or Generic Framing Procedure (GFP).

In the OTN as disclosed in the ITU-T G 708 OTN Interfaces recommendation, a digital wrapper encapsulates frames of data to allow multiple data sources to be sent on the same channel. The encapsulated frames of data are referred to has OTN frames. Each OTN frame comprises Optical Transport Unit (OTU) overhead, Optical Data Unit (ODU) overhead and Optical Payload Unit (OPU) payload. The OTU overhead comprises bytes to provide optical selection layer Performance Monitoring (PM), alarm indication and the GCC0 data communication channel. The ODU overhead comprises information that supports path-level monitoring, alarm indication signals, automatic protection switching bytes, and embedded data communication channels. A client signal is mapped into the OPU payload, while the OPU overhead provides information on the type of signal mapped into the payload and the mapping structure.

More specifically, GFP is a client mapping or adaptation mechanism defined by ITU Telecommunication (ITU-T) Recommendation G.7041. GFP is employed by network elements to facilitate transport of client signal(s) over channels. GFP is used to adapt client signal octets so that they can be communicated over a transport network. The GFP mechanism comprises client-specific aspects and common aspects. The client-specific aspects include client signal adaptation methods for both PDU-oriented client signals and block-code oriented client signals. The client signal adaptation for PDU-oriented client signals is referred to as frame-mapped GFP adaptation or GFP-F adaptation. The client signal adaptation for block-code oriented signals is referred to as transparent GFP adaptation or GFP-T adaptation. There are other mapping mechanisms that employ justification OH bytes such as AMP, IMP and BMP.

SUMMARY

This document concerns systems and methods for improving network element security. The methods comprise: obtaining a transport frame by the network element; and analyzing, by the network element, the transport frame to determine whether or not any vulnerable overhead field values in an octet of a header of a mapping layer frame and/or the overhead octets in or header of a transport layer frame have values other than expected values. The vulnerable overhead field values can include, but are not limited to, reserved overhead field value, unused field values, experimental field value, and/or proprietary field values. There may be two modes of operation, namely a passive mode and an active mode. In the passive mode, the network element need not change any bits in the vulnerable overhead field values even if misuse is detected. The network element may flag the detected misuse to operators. When operating in active mode and a determination is made that the at least one vulnerable overhead field value has a value other than the expected value, the network element may modify at least one reserved target field value in the transport frame, and communicate the transport frame with the modified at least one reserved target field value over a network. When a determination is made that each of the vulnerable overhead field values has the expected value, the network element may communicate the transport frame without any modification(s) over the network.

The mapping layer frame can include, but is not limited to, a GFP frame, an Asynchronous Mapping Procedure (AMP) frame, a Bit-synchronous Mapping Procedure (BMP) frame, an Idle Mapping Procedure (IMP) frame or a Generic Mapping Procedure (GMP). The transport layer frame can include, but is not limited to, an OTN frame, an SDH network frame, or a SONET frame.

In some scenarios, the network element obtains a policy or rule for processing the transport frame in response to a determination that at least one vulnerable overhead field value of the vulnerable overhead field values has a value other than the expected value. The policy or rule may require that: the reserved target field value be set to the expected value, be set to zero, or be set to a pre-defined value to prevent an infiltration of a given network; the network element ignores that a given vulnerable overhead field value of the vulnerable overhead field values has a value other than the expected value, and communicates the transport frame over a network when all other ones of the vulnerable overhead field values have the expected values; and/or the network element issue an alarm or output a notification. It should be noted that the open industry standard requires that reserved and non-sourced overhead bytes be set to zero.

If the mechanism is configured to check a field or value rather than ignore the same, then network element may not alter the reserved target field value but logs, notifies, alarms and/or stores the reserved target field value per the current treatment policy. The mechanism ignores the overhead field octets that it is not pre-configured to check regardless of whether the overhead field value is compliant with standards or local operator configured values or not.

The policy or rule may be selected based on a result from performance of a machine learning algorithm to detect a pattern of values in the reserved values in at least one of the header of the mapping layer frame and the header of the transport layer frame. The result from the machine learning may identify at least one of a source of malicious activity or a type of malicious activity.

In the GFP scenarios, the present solution can be employed to secure GFP payload header fields within a network element's GFP-equipment interface. Thus, the methods may comprise: obtaining a transport frame; extracting GFP frames from the transport frame; and analyzing the GFP frame to determine whether or not any reserved bits in the GFP frame payload header fields have values other than expected values. When a determination is made that there is at least one reserved GFP payload header field bit that has a value other than the expected value, the mechanism may modify at least one reserved value in the GFP payload header field, and communicate the GFP frame with the modified at least one reserved value over a network or to a mapping layer formatting circuit. When a determination is made that each of the reserved values has the expected value, the network element may communicate the transport frame without any modification(s) over the network.

The implementing systems comprise: a processor; and a non-transitory computer-readable/writeable storage medium comprising programming instructions that are configured to cause the processor to implement the above described methods.

BRIEF DESCRIPTION OF THE DRAWINGS

This disclosure is facilitated by reference to the following drawing figures, in which like numerals represent like items throughout the figures.

FIGS. 16-20 provide illustrations useful for understanding non-export controlled information.

DETAILED DESCRIPTION

Figure 1:
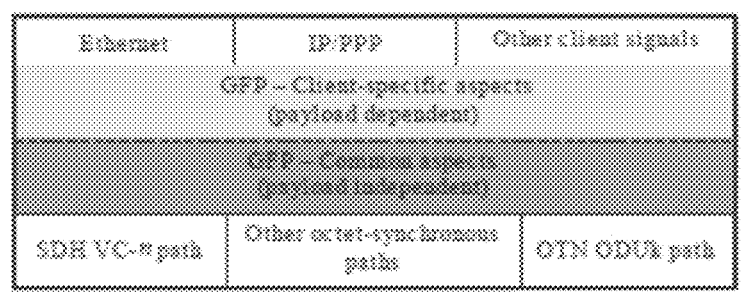
FIG. 1 provides an illustration showing a GFP relationship to client signals and transport paths.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The reserved, unused, experimental and proprietary overhead fields of transport technologies are exploitable and vulnerable, as are the packet header Type-Length-Value (TLV) fields. Since intruders (external and internal) can exploit these vulnerabilities to infiltrate or exfiltrate large amounts of data, the vulnerabilities are a threat to network security. Prior to the present solution, no mechanism existed that would systematically and thoroughly eliminate these vulnerabilities. The present mechanism monitors these vulnerabilities to detect misuse of vulnerable fields, and if so configured, will eliminate the intruding data.

As noted above, GFP is a client mapping or adaptation mechanism defined by the ITU-T Recommendation G.7041 and is employed by network elements. GFP is used to adapt traffic from client signal(s) so that they can be communicated over a transport network. More specifically, a network element receives and processes client signals to map client signal frames into GFP frames. Next, the GFP frames may be consolidated into transport layer frame(s).

The GFP frames and the transport layer frame overhead fields have multiple vulnerabilities that allow intruders to infiltrate or exfiltrate data from and into networks. Exploitation of these vulnerabilities is made through remote or local management commands available in network equipment that activate reserved, unused, proprietary and experimental overhead fields, payload types and identifiers. Network equipment manufacturers include these commands as an added value feature used at the operator's risk because their use can cause interoperability issues. The exploitation actor can be an insider threat of a local operating company, an adversarial nation military, espionage agency, or an equipment supplier employee leveraging remoter network element access.

Impacts resulting from exploitation of the GFP and transport network overhead field vulnerabilities to both the targeted network and user/mission data are severe. For example, the network can be disrupted by creating a high volume of GFP management messages or transport frames (denial of service). The network can be disabled by infiltrating malicious code (denial of service). Large volumes of user and/or mission data can be compromised by capture and exfiltration.

Thus, there is a need for commercial, defense and government enterprises to mitigate the vulnerabilities in (i) mapping layer frames (e.g., GFP frames, AMP frames, BMP frames, GMP frames and/or IMP frames) and (ii) transport layer frames (e.g., OTN frames, SDH frames, and/or SONET frames). No such solution currently exists. The ITU-T standard does not provide any management, control, or procedural mechanisms for mitigating these GFP and transport overhead field vulnerabilities.

FIGS. 1-5 provide illustrations that are useful for understanding GFP, GFP vulnerabilities, OTNs, and OTN overhead field vulnerabilities. Similar vulnerabilities exist in other types of mapping layer framing protocols (e.g., AMP, BMP, GMP and IMP) and transport layer (e.g., SDH framing protocols, and/or SONET framing protocols).

Referring now to FIG. 1, there is provided an illustration of an illustrative network system architecture diagram. As shown in FIG. 1, a network element receives a plurality of client signals from client devices (or end user computing devices), processes the same to map the client signal frames into GFP layer frames, map the mapping GFP layer frames into transport layer frames. The underlying transport technology then passes the frames to the transport network interface. The transport network interface communicates the transport frames over a transport network. The transport network can include, but is not limited to, a Synchronous Digital Hierarchy (SDH) network, a network, and/or an Optical Transport Network (OTN).

The client signals can be PDU-oriented (e.g., Ethernet or IP/PPP) signals or other types of signals (e.g., block-code orientated). Accordingly, information in the client signals can be in an Ethernet Media Access Control (MAC) frame format, an IP/PPP frame format, a Fiber Channel frame format, an Enterprise Systems Connection (ESCON) frame format, a Fiber Connection (FICON) frame format and/or other client signal frame format. The GFP layer frame format can include, but is not limited to, a GFP frame format, an AMP frame format, a BMP frame format, and/or an IMP frame format.

In the GFP scenarios, the network element implements a generic GFP mechanism that is configured to adapt traffic from client signals so that they can be communicated over a network. The network can include, but is not limited to, an Internet Protocol (IP) network, an Ethernet network, the SDH network, the SONET network, the OTN, and/or another network. The GFP mechanism comprises client-specific aspects and common aspects. The client-specific aspects include client signal adaptation that applies to PDU-oriented client signals and block-code oriented signals. The client signal adaptation for PDU-oriented client signals is referred to as frame-mapped GFP adaptation or GFP-F adaptation. The client signal adaptation for block-code oriented signals is referred to as transparent GFP adaptation or GFP-T adaptation.

Figure 2:
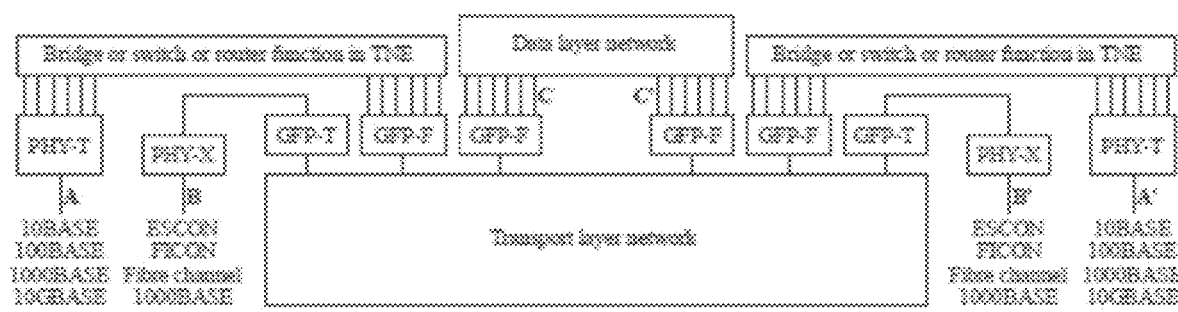
FIG. 2 provides an illustration showing a GFP functional model.

FIG. 2 provides an illustration of a GFP functional model for a single client application. The GFP's architectural flexibility facilitates mapping many different variable length client signal types over an equally diverse set of transport network technologies. This mapping generally involves mapping each client signal frame into GFP frame(s), and mapping a plurality of GFP frames in their entirety into transport layer frame(s). However, this necessitates a system of unique GFP layer identifiers within the GFP frame overhead whose reserved values are vulnerabilities.

Figure 3:
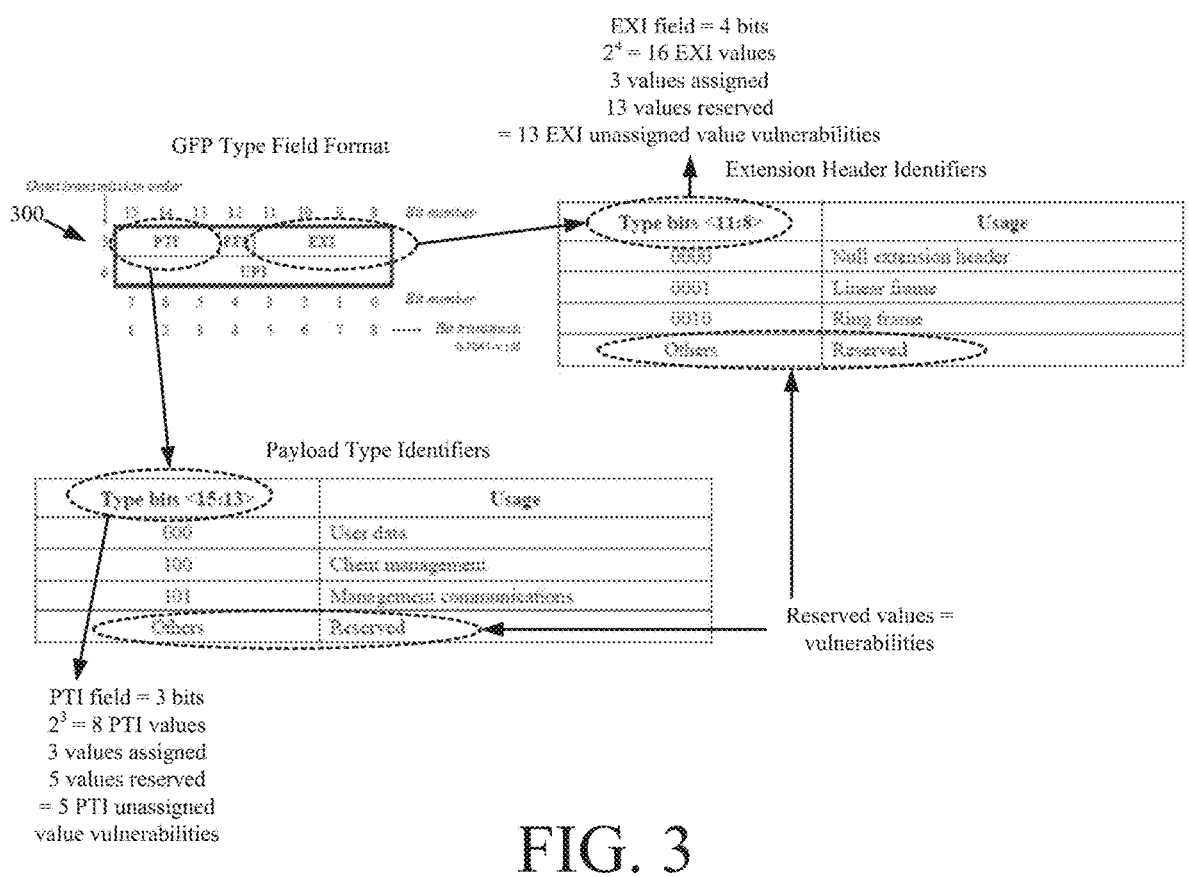
FIGS. 3-4 provide illustrations that are useful for understanding vulnerable unassigned values of a GFP frame.
Figure 4:
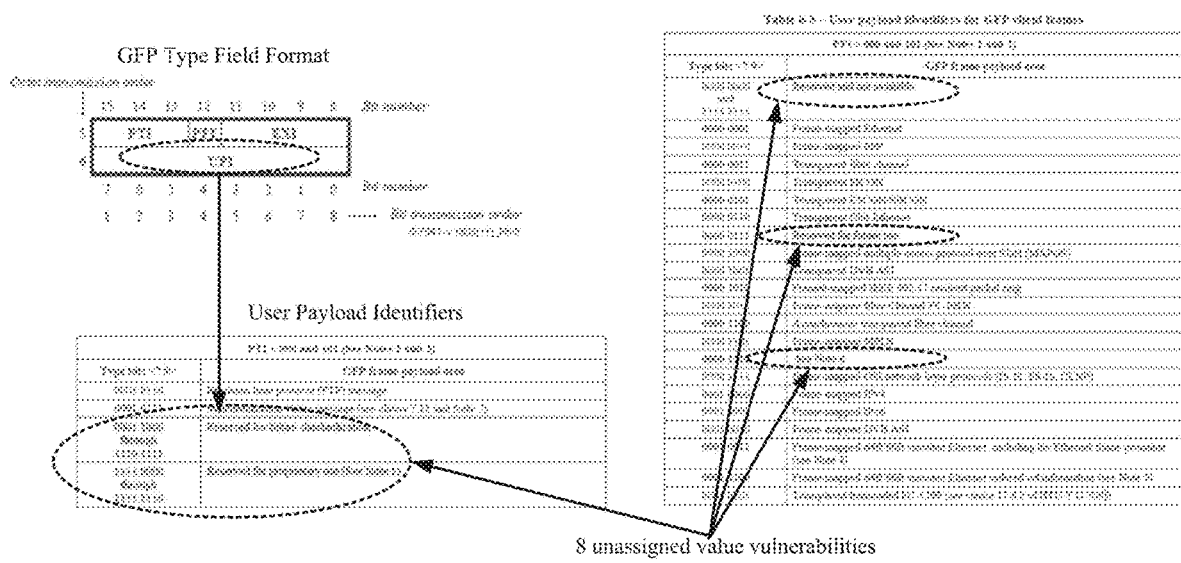

FIGS. 3-4 provide illustrations of a GFP type field format for a GFP payload header 300. There are four GFP type fields for both transmit and receive signals. These fields include a Payload Type Identifier (PTI) field, an Extension Header Identifier (EXI) field, a Payload FCS Identifier (PFI) field, and a User Payload Identifier (UPI) field. Vulnerabilities exist in the following three GFP type fields: the PTI field, the EXI field and the UPI field. The PTI field has a vulnerability quantity of 5 PTI unassigned or reserved values as shown in FIG. 3. The EXI field has a vulnerability quantity of 13 EXI unassigned or reserved values as shown in FIG. 3. The UPI field has a vulnerability quantity of 8 UPI unassigned or reserved values as shown in FIG. 4.

The standard requires these unassigned or reserved values of the PTI, EXI and UPI fields be set to zero. However, they are considered vulnerable values because a remote intruder or a network operator can set these values to non-zero values for malicious purposes (e.g., to install, initiate or activate malware on a client device) with any detection by the system. As noted above, conventional systems do not provide any security controls that would enable network operators to mitigate these vulnerabilities. The GFP vulnerabilities are many in number, and include reserved and proprietary management message variants. This large number of vulnerabilities exacerbates the problem by expanding the cyberattack surface.

Figure 5A:
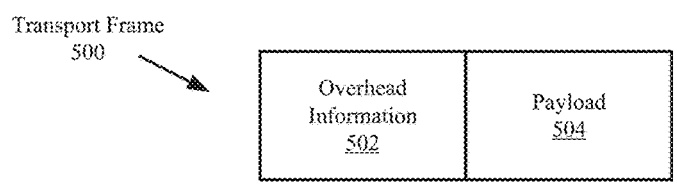
FIGS. 5A-5B (collectively referred to herein as "FIG. 5") provides an illustration that is useful for understanding vulnerable unassigned values of a transport frame.
Figure 5B:
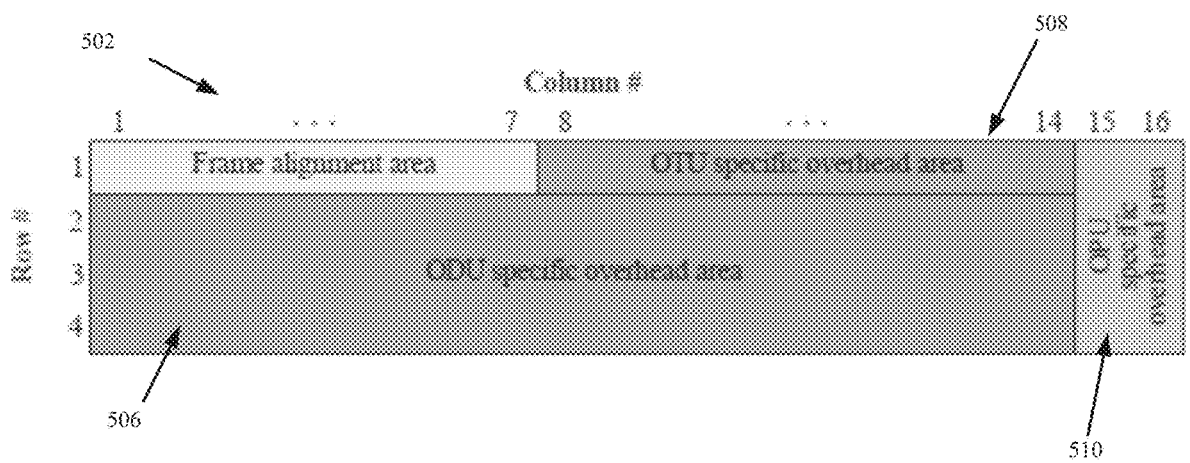

Vulnerabilities also exist in the transport layer frames. The transport layer frames include, but are not limited to, OTN frames, SDH frames, and/or SONET frames. FIGS. 5A-5B provide illustrations of a transport layer frame 500 for an OTN. The present solution is not limited to the OTN overhead structure shown in these figures. As understood by persons skilled in the art, other OTN overhead structures are known, and the present solution can be employed in relation these known OTN overhead structures and to be known OTN overhead structures. The transport layer frame 500 comprises overhead (OH) information 502 and payload 504. The payload 504 comprises information from a plurality of client signal in a mapped GFP frame format. The OH information 502 is similar to packet headers. The OH information 502 conveys essential control, signaling and maintenance signals in a bit-mapped format, a bit or byte field format, or a packet format. The OH information 502 contains many unused, experimental, or reserved OH fields. The unused or reserved OH fields can be exploited to infiltrate or exfiltrate information in high volumes. In some cases, the vulnerability of an OH field which is assigned a value from a list of standards defined values lies in the presences of unused and/or reserved values.

Unscrupulous equipment manufacturers or network operators may use reserved, experimental, proprietary, or unused OH field values for non-standard, possibly malicious purposes. The unused or reserved OH field values are not currently checked for malicious activity by the OTN network elements and/or network management systems. Thus, OTN network element manufacturers can embed automated functions in the OTN network management systems that can facilitate exploitation of unused and reserved OH values by malicious actors. The existence of these automated functions are transparent to the OTN network management systems. The risk associated with this vulnerability grows as OTN link capacity increases. As OTN link capacity grows, reserved OH fields capacity increases.

This document discusses a solution for such mitigation of inbound client mapped transport frame vulnerabilities and outbound transport frame vulnerabilities. The present solution generally concerns systems and methods for inbound/outbound transport frame vulnerability monitoring and mitigation in a network environment. Users of the present solution can customize: (1) detect; (2) detect and zeroize; (3) detect and replace; (4) detect and disable; (5) detect and re-route; (6) detect null; (7) detect null test; (8) detect Pseudo-Random Binary Signal (PRBS) test; (9) detect maintenance signal; (10) detect Payload Type (PT) mismatch; (11) passive monitor; (12) a vulnerability search pattern and frequency (including a random search of vulnerable OH locations, excluding known use of vulnerability locations by the network operator); (13) mitigation actions (e.g., recording the values found in robbed reserved OH byte locations, zeroing the values, raising alarms and notifications, and/or logging); (14) results reporting content and frequency; (15) alarm and notification severity and thresholds; (16) defense readiness states and attack intensity states; (17) administration of defense domains and boundaries, and/or (18) detect and log system data.

The present solution can consist of, for example: embedded transport frame monitoring and mitigation network mechanism and methods; stand-alone transport frame monitoring and mitigation network mechanism and methods; distributed transport frame monitoring and mitigation network mechanism and methods; virtualized transport frame monitoring and mitigation network mechanism and methods; and various modes of operation (e.g., rapid deployment of virtual network functions, Monitor 1 or multiple protocol layers in the same signal or multiple signals); and/or unidirectional or bidirectional monitoring.

There are many novel aspects of the present solution. For example, the present solution mitigates all four GFP vulnerability types spanning PTI, EXI and UPI fields for both transmit and receive signals in a flexible but comprehensive manner, mitigates transport frame OH vulnerabilities, and/or mitigates vulnerabilities of other types of client mapped transport frames. Mitigating these transport frame vulnerabilities is not addressed by conventional solutions. The adaptable and flexible implementation of the present solution is novel.

Figure 6:
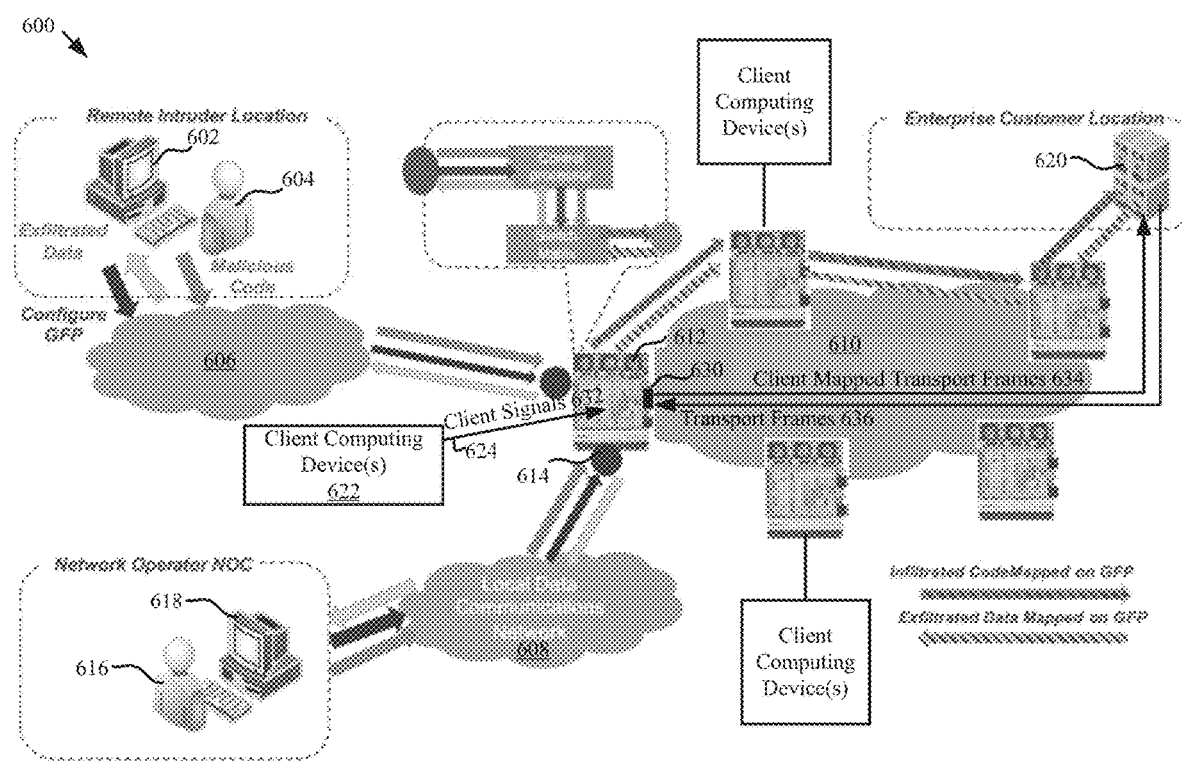
FIG. 6 provides an illustration of a system.

Referring now to FIG. 6, there is provided an illustration of an illustrative system 600 implementing the present solution. System 600 comprises client computing device(s) 622 communicatively coupled to network elements 612 via communication link(s) 624. During operations, the client computing devices 622 generate client signals 632 and communicate the same over communication link(s) 624 to network element(s) 612. The information of the client signals can be in Layer 1, 2 or 3 protocol formats selected in accordance with a given application. For example, the information is in an Ethernet MAC frame format, an IP/PPP frame format, a Fiber Channel frame format, an ESCON frame format, a FICON frame format and/or other client signal frame format when communicated over communication link(s) 624. The listed types of client signal frame formats are well known.

At a network element 612, the client signals 632 are received and processed to extract the client signal data therefrom. The client signals are both packet based (IP) and frame-based (e.g., Ethernet, Fiber Channel, etc.). The client signal data is then mapped by OTN, SONET, SDH, or GFP to transport frames for communication over a service provider network 610 to remote computing device(s) 620 (e.g., server(s)). The service provider network 610 can include, but is not limited to, an SDH network, a SONET network, and/or an OTN. The signal processing performed by the network element 612 can include: mapping each client signal frame contained in each client signal 632 into a GFP frame; and mapping the GFP frames into transport frames 634 (e.g., transport frame 500 of FIGS. 5A-5B) using the GFP frames as payload (e.g., payload 504 of FIG. 5A). The client mapped transport frames 634 are also referred to herein as transport frames, transport stratum, inbound transport frames and/or incoming transport frames. The client mapped transport frames 634 are provided to a transport network interface 630 of the network element 612. The transport network interface 630 communicates the client mapped transport frames 634 over a service provider network 610 to the remote computing device(s) 620.

The network element 612 is also configured to perform the reverse of the above described operations when information is being communicated from the remote computing device(s) 620 to the client computing device(s) 622. For example, the transport network interface 630 receives transport frames 636 sent from the remote computing device(s) 620 over the service provider network 610. These transport frames are also referred to herein as transport layer frames, outbound transport frames and/or outgoing transport frames. The outbound/outgoing transport frames 636 are then processed by the network element 612 to convert a format of the information thereof into a client signal format (e.g., an Ethernet MAC frame format and/or an IP/PPP frame format) suitable for communication to the client computing device (s) 622 over communication link(s) 624.

In some scenarios, one or more values of inbound and outbound transport frame(s) 634, 636 is (are) modified in accordance with malware installed on the network element 612 by a remote intruder 604 and/or a network operator 616. Both malicious actors 604, 616 can be: equipment supplier employees located in that organization's support center who uses special access known as a phone home capability to exploit the overhead and GFP vulnerabilities of the target network element. The phone home capability may exist for checking licenses, performing troubleshooting and maintenance, updating software and firmware, and/or monitoring the network element for fault and performance issues. The later item may be performed as a contracted professional service in lieu of the network operator performing this role from their own Network Operating Center (NOC). The malicious actors 604, 616 can also be in Network Operating Centers (NOCs) that use network management systems configured to manage and control mapping and transport frame creation operations of all network elements 612 in the service provider network. For example, the remote intruder 604 uses a computing device 602 to install and initiate/ activate malicious code on network element 612, where the malicious code is configured to cause one or more vulnerable fields or values of the inbound and/or outbound GFP layer frames and/or transport frame(s) 634, 636 to be changed to non-zero values or values with are not specified by a given standard (e.g., the ITU-T standard). The value changes can be selected, for example, to cause data to be sent to a site of the remote intruder, cause malicious code to be installed on a network elements 612, and/or cause trigger/ initiation/activation of malware installed on a network elements 612. The network operator 616 can use a computing device 618 in the same or similar manner. The present solution is not limited to the particulars of this example. The vulnerable fields and values can include, but are not limited to, those mentioned above in relation to FIGS. 1-5 (e.g., the 5 PTI unassigned/reserved values of FIG. 3, the 13 EXI unassigned/reserved values of FIG. 3, the 8 unassigned/ reserved values of FIG. 4, and/or the OH values 506, 508, 510 of FIG. 5B).

The network elements 612 are advantageously configured to monitor and mitigate the malicious use of vulnerable unassigned/reserved fields and values of GFP frames contained in transport frames 634, 636. For example, the network element 612 is configured to: monitor incoming and outgoing GFP frame identifier fields and transport frame OH fields for use of reserved or proprietary payload identifier values; perform policy or Artificial Intelligence (AI) based local or remote control of vulnerable searches and mitigation actions; collect and forward fault and performance information to a management system; and secure an entity and configure the same. The manner in which the monitoring and mitigating is achieved will become more evident as the discussion progresses.

Figure 7:
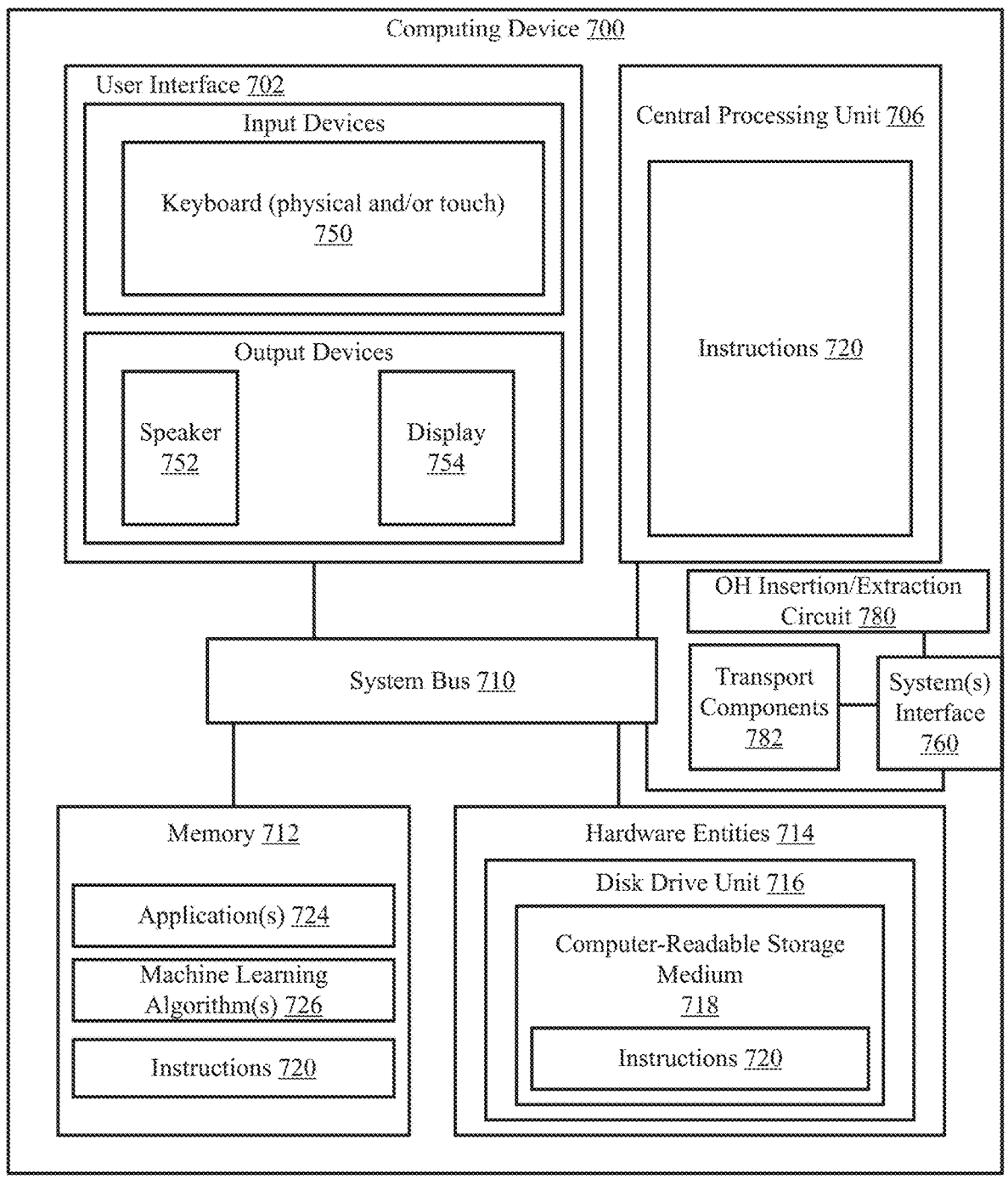
FIG. 7 provides an illustration of an architecture for a computing device.

Referring now to FIG. 7, there is provided an illustration of an illustrative computing device 700. Client computing device(s) 622, network element(s) 612 and/or computing devices 602, 618, 620 of FIG. 6 can be the same as or similar to computing device 700. As such, the discussion of computing device 700 is sufficient for understanding the components 602, 612, 618, 620 and 622 of FIG. 6.

Computing device 700 may include more or less components than those shown in FIG. 7. For example, the computing device 700 may be absent of the display, keyboard and mouse when it is a network element. In this case, the computing device 700 can have a local port for attaching a laptop used as a craft terminal device (e.g., a local maintenance technician device) and have one or more remote management ports that through a management network connect to an NOC NMS/EMS operator workstation. In its standalone mode, the present solution may have similar ports. Further, two opposing system interfaces may be provided that connect through a time slot interchange matrix module via transport buses separate from the system bus. The system bus may connect to these transport devices for management and control purposes. However, the components shown are sufficient to disclose an illustrative solution implementing the present solution. The hardware architecture of FIG. 7 represents one implementation of a representative computing device configured to improve network element security, as described herein. As such, the computing device 700 of FIG. 7 may implement at least a portion of the method(s) described herein.

Some or all components of the computing device 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the computing device 700 comprises a user interface 702, a Central Processing Unit (CPU) 706, a system bus 710, a memory 712 connected to and accessible by other portions of computing device 700 through system bus 710, system interface(s) 760, an OH insertion/extraction circuit 780, transport components 782, and hardware entities 714 connected to system bus 710. The user interface can include input devices and output devices, which facilitate user-software interactions for controlling operations of the computing device 700. The input devices include, but are not limited to, a physical and/or touch keyboard 750. The input devices can be connected to the computing device 700 via a wired or wireless connection. The wired connections can include, but are not limited to, copper connections and fibre connections. The output devices include, but are not limited to, a speaker 752, and/or a display 754. System interface 760 is configured to facilitate wired or wireless communications to and from external devices (e.g., network nodes such as access points, etc.).

Notably, the transport paths from interfaces 760 to internal transport frame handling components may be separate from the system bus 710. The transport components 782 can include, but are not limited to, mux/demuxs, framers, adaptors, OH processors, and/or a time slot interchange device. Each of the listed transport components can have its own interconnecting buses. These transport components may not have dedicated system bus ports for management and control purposes—it is through these system bus ports that the transport components can be configured.

At least some of the hardware entities 714 perform actions involving access to and use of memory 712, which can be a Random Access Memory (RAM), a disk drive, flash memory, read-only ROM or EPROM, a Compact Disc Read Only Memory (CD-ROM) and/or another hardware device that is capable of storing instructions and data. Hardware entities 714 can include a disk drive unit 716 comprising a computer-readable storage medium 718 on which is stored one or more sets of instructions 720 (e.g., software code) configured to implement one or more of the methodologies, procedures, or functions described herein. The instructions 720 can also reside, completely or at least partially, within the memory 712 and/or within the CPU 706 during execution thereof by the computing device 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

Figure 8:
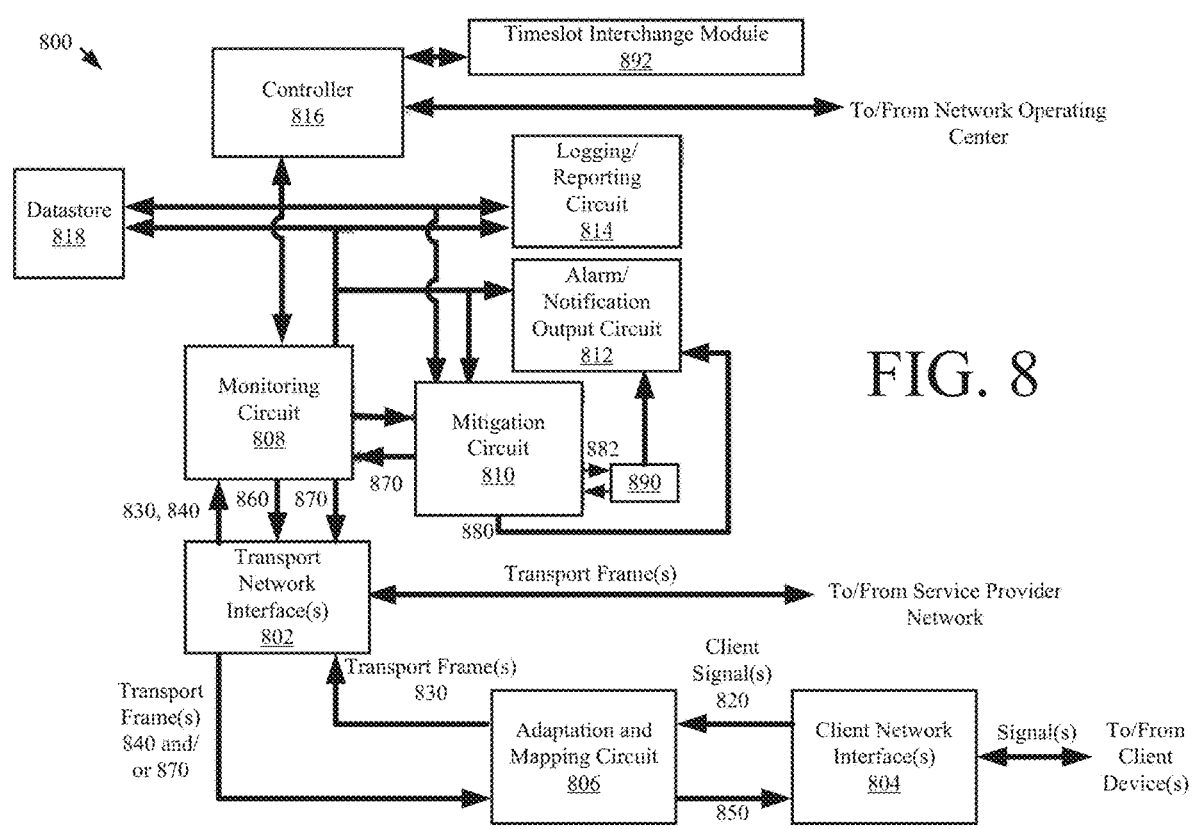
FIG. 8 provides an illustration of an architecture for a network element.

Referring now to FIG. 8, there is provided an illustration that is useful for understanding operations of a network element 800 in accordance with the present solution. Network element(s) 612 of FIG. 6 can be the same as or similar to network element 800. As such, the discussion of network element 800 is sufficient for understanding network element(s) 612 of FIG. 6.

As shown in FIG. 8, network element 800 comprises transport network interface(s) 802 and client network interface(s) 804. It should be noted that, the transported client data generally may not use the system bus. Transport network interface 630 of FIG. 6 can be the same as or similar to transport network interface(s) 802. Transport network interface(s) 802 is(are) configured to: receive inbound/incoming transport frames 830 from an Adaptation and Mapping (AM) circuit 806 and send the same over a service provider network (e.g., service provider network 610 of FIG. 6); and receive outbound/outgoing transport frames 840 sent over the service provider network and pass the same to the AM circuit 806.

The AM circuit 806 processes the outbound/outgoing transport frames 840 to place the information contained therein in a format suitable for communication to client device(s) (e.g., client device(s) 622 of FIG. 6). More specifically, the AM circuit 806 extracts payload information from the outbound/outgoing transport frames 840; maps a frame format of the payload information to a client signal frame format (e.g., an Ethernet frame format or an IP/PPP frame format); and sends the client signal frames 850 to the client network interface(s) 804 for communication to client device(s).

The client network interface(s) 804 is (are) configured to: receive inbound/incoming client signals 820 and pass the same to the AM circuit 806; and receive client signal frames 850 from the AM circuit 806 and communicate the same over a communication link (e.g., communication link 624 of FIG. 6) to client device(s).

The AM circuit 806 processes the inbound/incoming client signals 820 to place the information contained therein in a format suitable for communication to remote computing device(s) (e.g., computing devices(s) 620 of FIG. 6) over the service provider network. More specifically, the AM circuit 806 extracts client signal frames from the inbound/incoming client signals 820; maps the client signal frames (e.g., Ethernet MAC frames and/or IP/PPP frames) into frames (e.g., GFP frames, AMP frames, IMP frames and/or BMP frames); uses layer frames to generate inbound/incoming transport frame(s) 830; and passes the inbound/incoming transport frame(s) 830 to the transport network interface(s) 802 for communication(s) over a service provider network.

The transport network interface(s) 802 is (are) configured to provide the transport frames 830, 840 to a monitoring circuit 808. The monitoring circuit 808 analyzes each transport frame 830, 840 to determine whether or not any vulnerable unassigned/reserved fields and values thereof have values (e.g., have non-zero values) other than the values defined by a given standard (e.g., the ITU-T standard). The vulnerable unassigned/reserved fields and values can include, but are not limited to, unassigned/reserved values in the GFP frames (e.g., in a PTI field of a GFP frame, the EXI field of the GFP frame, and/or the UPI field of a GFP frame) and/or unassigned/reserved fields and values in the overhead (e.g., overhead 502 of FIG. 5) of the OTN, SONET and/or SDH transport frame. An extraction function can be employed that separates the OH fields from the frame.

The present solution can operate in two modes, namely a passive mode and an active mode. The mechanism can act in the passive mode if no mitigation treatments are configured. In the passive mode, frames are duplicated; one duplicate frame stream exits directly through the network interface while the other is passed to the monitor.

In the active mode, if the monitoring circuit 808 determines that none of the vulnerable unassigned/reserved values of the GFP frame(s) overhead and/or transport frame(s) overhead have a value other than the value defined by a given standard (e.g., the ITU-T standard), then the monitoring circuit 808 can pass the frame to the transport network interface(s) 802 and/or sends a command signal 860 to the transport network interface(s) 802. In response to the command signal 860, the transport network interface(s) 802 either (i) perform(s) operations to communicate the inbound/incoming transport frame(s) 830 over the service provider network or (ii) perform(s) operations to communicate the outbound/outgoing transport frame(s) 840 to the AM circuit 806.

In contrast, if the monitoring circuit 808 determines that one or more vulnerable unassigned/reserved values of the mapping layer frame(s) and/or the transport frame(s) has (have) value(s) (e.g., have non-zero values) other than the values defined by a given standard (e.g., the ITU-T standard), then the monitoring circuit 808 sends the transport frame(s) to the mitigation circuit 810. The mitigation circuit 810 performs mitigation operations in accordance with pre-defined rules and policies.

In some scenarios, the pre-defined rules and policies may cause the mitigation circuit 810 to performs operations to modify the vulnerable unassigned/reserved values of the mapping layer frame(s) and/or the transport frame(s) so as to set them all to zero or to the values defined by a given standard (e.g., the ITU-T standard). The modified transport frame(s) 870 is (are) then provided to the monitoring circuit 808. In this case, the monitoring circuit 808 provides the modified transport frame(s) 870 to the transport network interface(s) 802. A command signal 860 may additionally or alternatively be communicated to the transport network interface(s) 802. In response to the command, the transport network interface(s) 802 either (i) perform(s) operations to communicate the modified transport frame(s) 870 over the service provider network or (ii) performs operation(s) to communicate the modified transport frame(s) 870 to the AM circuit 806.

Additionally or alternatively, the pre-defined rules and policies may cause the mitigation circuit 810 to: capture and store the vulnerable unassigned/reserved values in datastore 818; ignore certain unassigned/reserved values (e.g., because the network service provider is using the same for proprietary reasons); and/or provide a signal 880 to an alarm/notification output circuit 812 and/or a signal 882 to an intelligent post-processing analysis circuit 890 when one or more vulnerable unassigned/reserved values has (have) value(s) (e.g., have non-zero values) other than the values defined by a given standard (e.g., the ITU-T standard).

In response to the signal 880 from the mitigation circuit 810, the alarm/notification output circuit 812 performs operations to output an alarm or other notification indicating that malicious activity has been detected and/or a remedial measure should be taken. Alternatively or additionally, the alarm/notification output circuit 812 performs operations to: compare each vulnerable unassigned/reserved value or a given set of vulnerable unassigned/reserved values to threshold value(s); and output an alarm, or other notification when the vulnerable unassigned/reserved value(s) is (are) less than or greater than the threshold value(s). The alarm can include, but is not limited to, an auditory alarm, a tactile alarm, and/or a visual alarm. The notification can include, but is not limited to, an electronic mail message, a text message, management protocol message, or a pre-recorded telephone message.

In response to signal 882, the intelligent post-processing analysis circuit 890 performs a machine learning algorithm (e.g., machine learning algorithm 726 of FIG. 7) to use machine learned patterns of vulnerable unassigned/reserved values to detect sources of malicious activity, detect a type of malicious activity, and/or make recommendations with regard to actions that should be taken in view of the detected source and/or type of malicious activity. The recommendation(s) can be sent from the intelligent post-processing analysis circuit 890 through its system bus attachment to management ports, then to NOC workstation.

The alarm/notification output circuit is configured to output a particular alarm or notification, and/or send the same to the mitigation circuit 810 for causing use of a particular rule or policy in relation to an analysis of mapping layer frame(s) and/or transport frame(s). For example, the particular rule or policy can cause the network element 800 to: pass the transport frame to a network without having the vulnerable unassigned/reserved values being modified (e.g., set to zero); cause the mitigation circuit 810 to substitute the vulnerable unassigned/reserved values of an outbound/outgoing transport frame with pre-defined values for infiltrating or taking another remedial measure against the malicious actor's network/device; and/or cause the mitigation circuit 810 to generate an outbound/outgoing frame with the vulnerable unassigned/reserved value(s) set to pre-defined values for infiltrating or taking another remedial measure against the malicious actor's network/device.

The machine-learning algorithm can employ supervised machine learning, semi-supervised machine learning, unsupervised machine learning, and/or reinforcement machine learning. Each of these listed types of machine-learning algorithms is well known in the art. In some scenarios, the machine-learning algorithm includes, but is not limited to, a decision tree learning algorithm, an association rule learning algorithm, an artificial neural network learning algorithm, a deep learning algorithm, an inductive logic programming based algorithm, a support vector machine based algorithm, a Bayesian network based algorithm, a representation learning algorithm, a similarity and metric learning algorithm, a sparse dictionary learning algorithm, a genetic algorithm, a rule-based machine-learning algorithm, and/or a learning classifier system based algorithm. The machine-learning process implemented by the present solution can be built using Commercial-Off-The-Shelf (COTS) tools (e.g., SAS available from SAS Institute Inc. of Cary, North Carolina).

Figure 9:
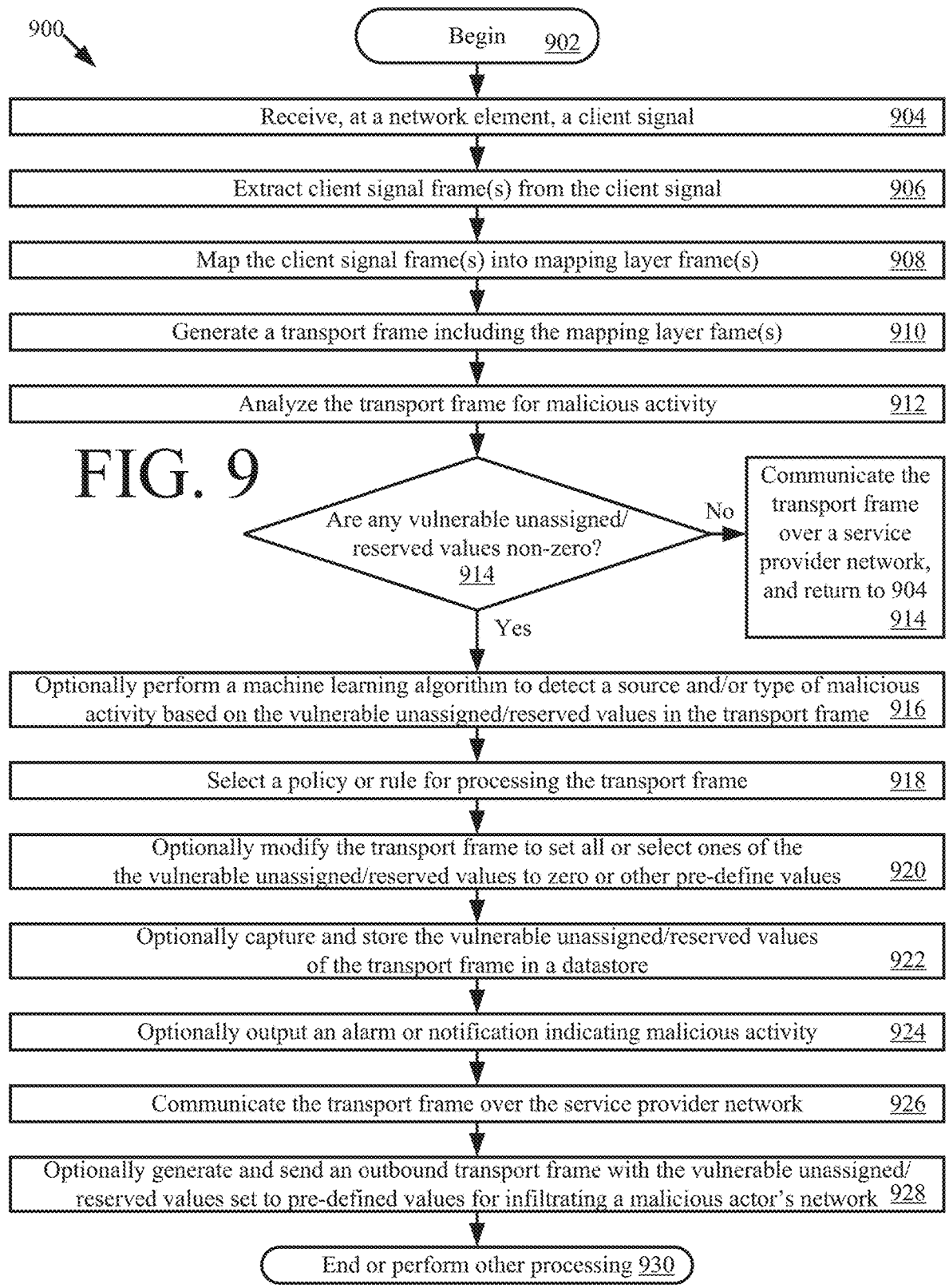
FIG. 9 provides a flow diagram of an illustrative method for operating a network element.

Referring now to FIG. 9, there is provided a flow diagram of an illustrative method 900 for operating a network element (e.g., network element 612 of FIG. 6, 700 of FIGS.

7 and/or 800 of FIG. 8). Method 900 begins with 902 and continues with 904 where the network element receives a client signal (e.g., client signal 632 of FIGS. 6 and/or 820 of FIG. 8). The client signal is processed in 906 to extract client signal frames therefrom. In 908, the network element performs operations to map the client signal frames (e.g., Ethernet MAC frames, IP/PPP frames, Fiber Channel frames, ESCON frames or FICON frames) into mapping layer frames (e.g., GFP frames, AMP frames, BMP frames, GMP frames or IMP frames). Techniques for mapping client signal frames into mapping layer frames are well known. Next in 910, the network element generates a transport frame (e.g., transport frame 500 of FIGS. 5 and/or 830 of FIG. 8) including the mapping layer frames. Techniques for generating transport frames are well known. For example, it is well known how to generate SDH, SONET and OTN frames.

In 912, the network element analyzes the transport frame for malicious activity. This analysis involves determining whether any vulnerable unassigned/reserved transport or GFP OH field values in the mapping layer frames and/or overhead of the transport frame have non-zero values or other values which are not pre-defined by a given standard (e.g., an ITU-T standard). The vulnerable unassigned/reserved values can include, but are not limited to, unassigned, reserved, proprietary use, or experimental unassigned/reserved fields or field values in an overhead (e.g., overhead 502 of FIG. 5) of the transport frame, and/or unassigned/reserved values in at least one field identifiers (e.g., PTIs, EXIs, and/or UPIs) of mapping layer frames.

If all of the vulnerable unassigned/reserved values are zero or otherwise match values pre-defined by a given standard (e.g., the ITU-T standard) [914: NO], then method 900 continues with 914 where the transport frame is communicated over a service provider network (e.g., service provider network 610 of FIG. 6). Method 900 may then return to 904 or other operations can be performed.

If one or more of the vulnerable unassigned/reserved field values are non-zero or otherwise do not match values pre-defined by a given standard (e.g., the ITU-T standard) [914: YES], then method 900 continues with 916 where a machine learning algorithm (e.g., machine learning algorithm 726 of FIG. 7) is optionally performed to detect a source and/or type of the malicious activity. This detection is made based on learned patterns in the vulnerable unassigned/reserved values which are associated with malicious actors (e.g., malicious actors 604, 616 of FIG. 6). For example, a given malicious actor has installed malware on the network element such that a specific pattern of vulnerable unassigned/reserved values exists in each transport frame, e.g., particular vulnerable unassigned/reserved values of a mapping layer frame header and/or overhead of a transport frame header have certain non-zero values. In this case, the given malicious actor and/or type of malware can be identified simply by detecting the specific pattern in a transport frame. The present solution is not limited in this regard.

In 918, a policy or rule is selected for processing the transport frame. This selection can be based on results from performing the machine learning algorithm in 916, and/or contents of the transport frame (e.g., a source of the client signal frames, a type of mapping layer frame format, etc.). The transport frame is processed in accordance with the policy or rule. This processing can involve the operations of optional blocks 920-924. The operations of 920-924 include: modifying the transport frame to set all or select ones of the vulnerable unassigned/reserved values to zero or other pre-defined values; capturing and storing the vulnerable unassigned/reserved values in a datastore (e.g., datastore 818 of FIG. 8); and outputting an alarm or notification indicating malicious activity.

Next in 926, the transport frame is communicated over the service provider network (e.g., service provider network 610 of FIG. 6). The network element may optionally generate and send an outbound transport frame with the vulnerable unassigned/reserved values set to pre-defined values for infiltrating a malicious actor's network, as shown by 928. Subsequently, 930 is performed where method 900 ends or other operations are performed.

Figure 10:
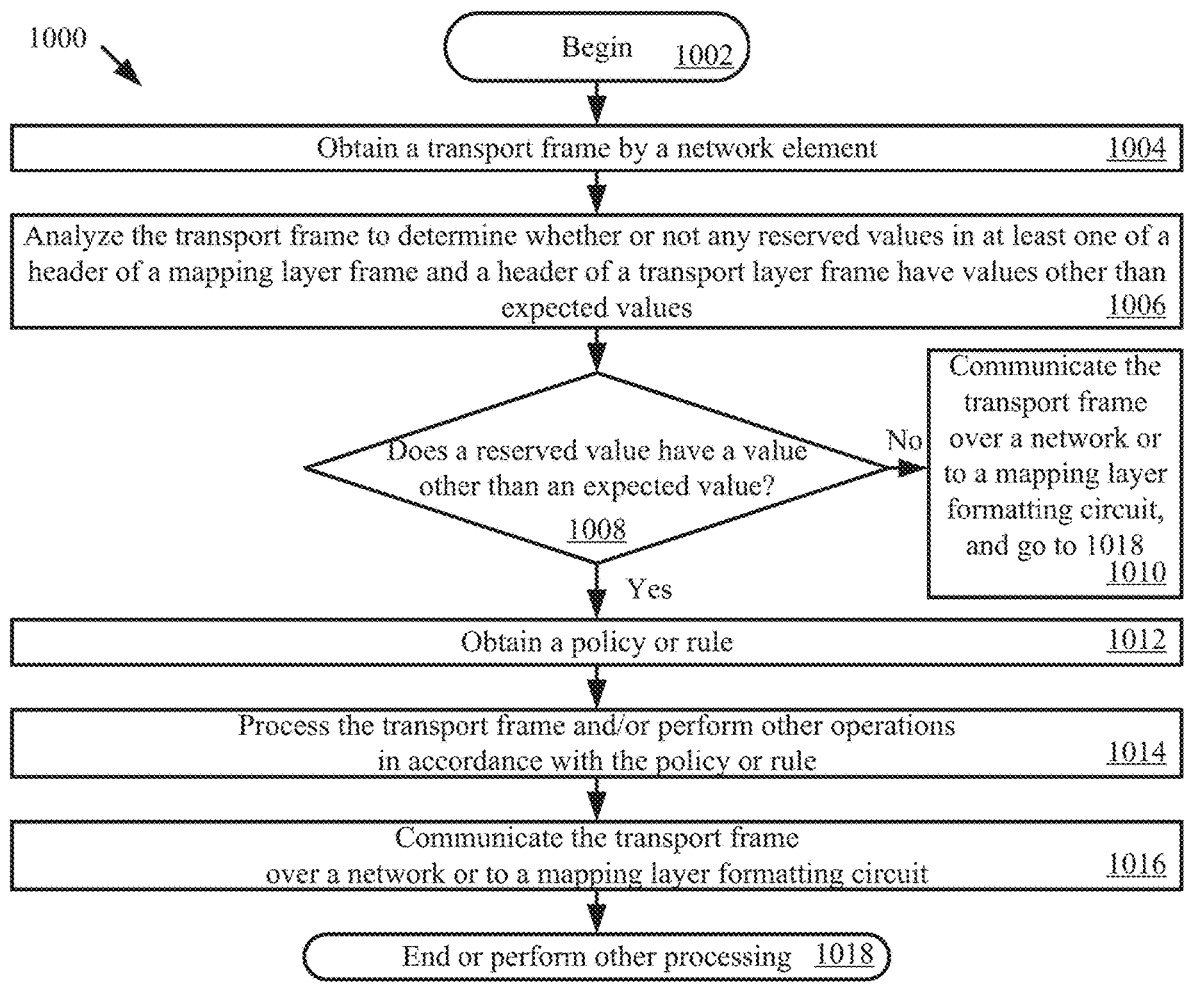
FIG. 10 provides a flow diagram of an illustrative method for operating a network element and/or improving network element security.

Referring now to FIG. 10, there is provided a flow diagram of an illustrative method 1000 for operating a network element. Method 1000 begins with 1002 and continues with 1004 where a network element (e.g., network element 612 of FIG. 6, 700 of FIG. 7, and/or 800 of FIG. 8) obtains a transport frame (e.g., transport frame 500 of FIG. 5, 830 of FIG. 8, or 840 of FIG. 8).

The network element analyzes the transport frame in 1006 to determine whether or not any reserved values in at least one of a header (e.g., header 300 of FIG. 3) of a mapping layer frame and a header (e.g., header 502 of FIG. 5) of a transport layer frame have values other than expected values. The reserved values can include, but are not limited to, reserved values in a payload type identifier field, reserved values in an extension header identifier field, reserved values in a user payload identifier field, and/or reserved values in overhead information. The mapping layer frame can include, but is not limited to, a GFP frame, an AMP frame, a BMP frame, or an IMP frame. The transport layer frame can include, but is not limited to, an OTN frame, an SDH network frame, or a SONET frame.

When a determination is made that all of the reserved values have their expected values [1008: NO], then the network element performs operation in 1010 to communicate the transport frame over (e.g., service provider network 610 of FIG. 6) or to a mapping layer formatting circuit (e.g., AM circuit 806 of FIG. 8). Method 1000 then continues to 1018 which will be described below.

When a determination is made that at least one reserved value has a value other than the expected value [1008: YES], the network element obtains a policy or rule as shown by 1012. The policy or rule may require that: the at least one reserved value be set to the expected value, be set to zero, or be set to a pre-defined value for preventing an infiltration of a given network; the network element ignore that a given reserved value of the reserved values has a value other than the expected value, and communicate the transport frame over a network when all other ones of the reserved values have the expected values; and/or the network element issue an alarm or output a notification.

In some scenarios, the policy or rule is selected based on a result from performance of a machine learning algorithm to detect a pattern of values in the reserved values in at least one of the header of the mapping layer frame and the header of the transport layer frame. The result from the machine learning may identify a source of malicious activity and/or a type of malicious activity.

In 1014, the network element processes the transport frame in accordance with the policy or rule. For example, the network element modifies the reserved value in the transport frame. In 1016, the transport frame is communicated over a network (e.g., service provider network 610 of FIG. 6) or to a mapping layer formatting circuit (e.g., AM circuit 806 of FIG. 8). Subsequently, 1018 is performed where method 1000 ends or other operations are performed (e.g., return to 1002).

Figure 11:
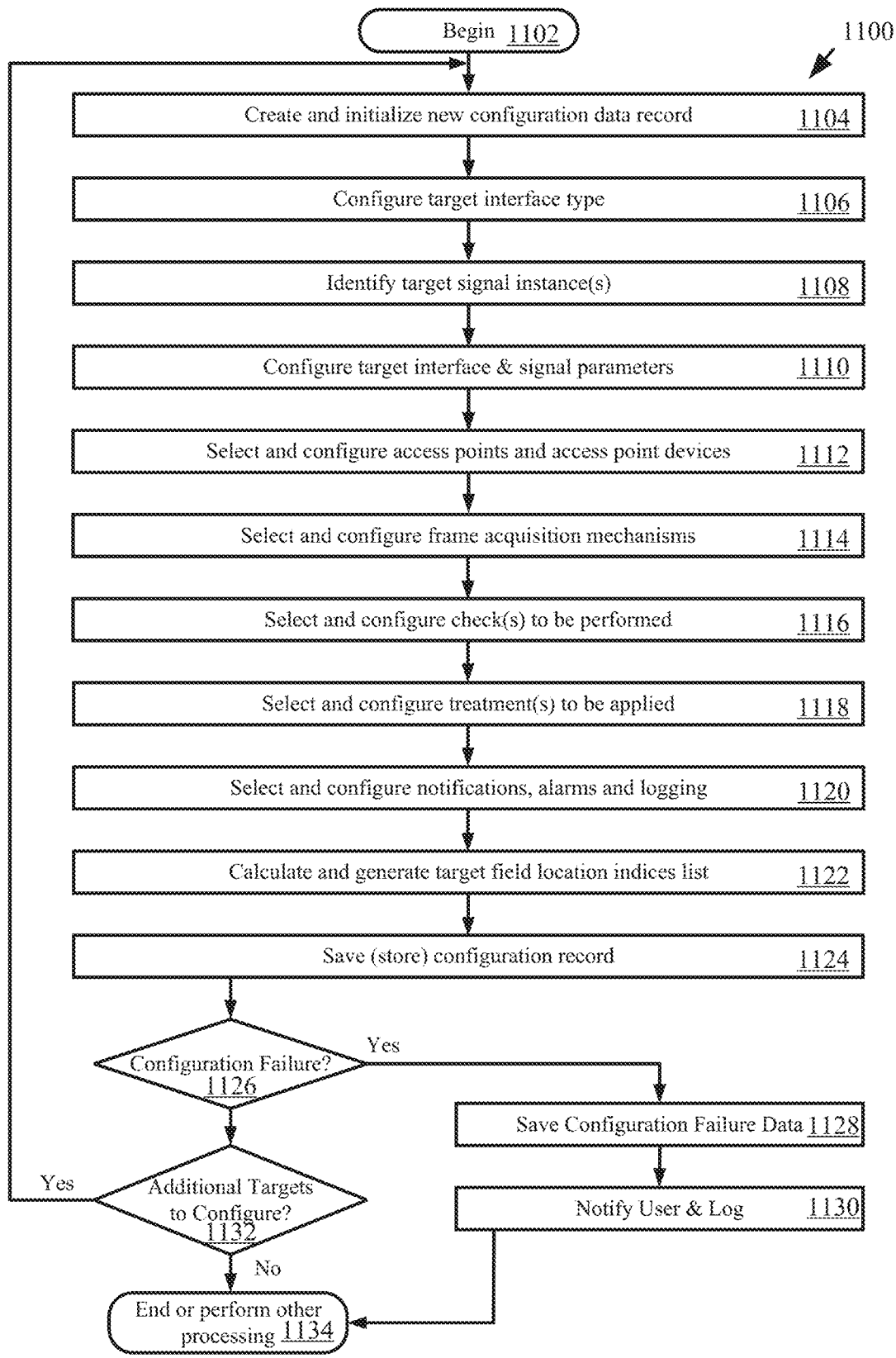
FIGS. 11-15 provide flow diagram of another illustrative method for operating a network element and/or improving network element security.

Referring now to FIGS. 11-15, there are provided flow diagrams of another illustrative method for operating a network element and/or improving network element security. As shown in FIG. 11, a pre-configuration method 1100 begins with 1102 and continues with 1104 where a new configuration data record is created and initialized. Next in 1106-1124, the following operations are performed: configuring a target interface type; identifying target signal instance(s); configuring target interface and signal parameters; selecting and configuring access points and access point devices; selecting and configuring frame acquisition mechanism; selecting and configuring check(s) to be performed; selecting and configuring treatment(s) to be applied; selecting and configuring notifications, alarms and logging; calculating and generating target field location indices list; and save/store configuration record.

Method 1100 continues with a decision as to whether there is a configuration failure. If so [1126: YES], then method 1100 continues with 1128-1130 where configuration failure data is saved, a user is notified and/or information is logged. Subsequently, 1134 is performed where method 1100 ends or other operations are performed.

If not [1126: NO], then a determination is made as to whether there are additional targets to configure. If so [1132: YES], method 1100 returns to 1104. Otherwise [1132: NO], method 1100 ends or other operations are performed as shown by block 1134.

Figure 12:
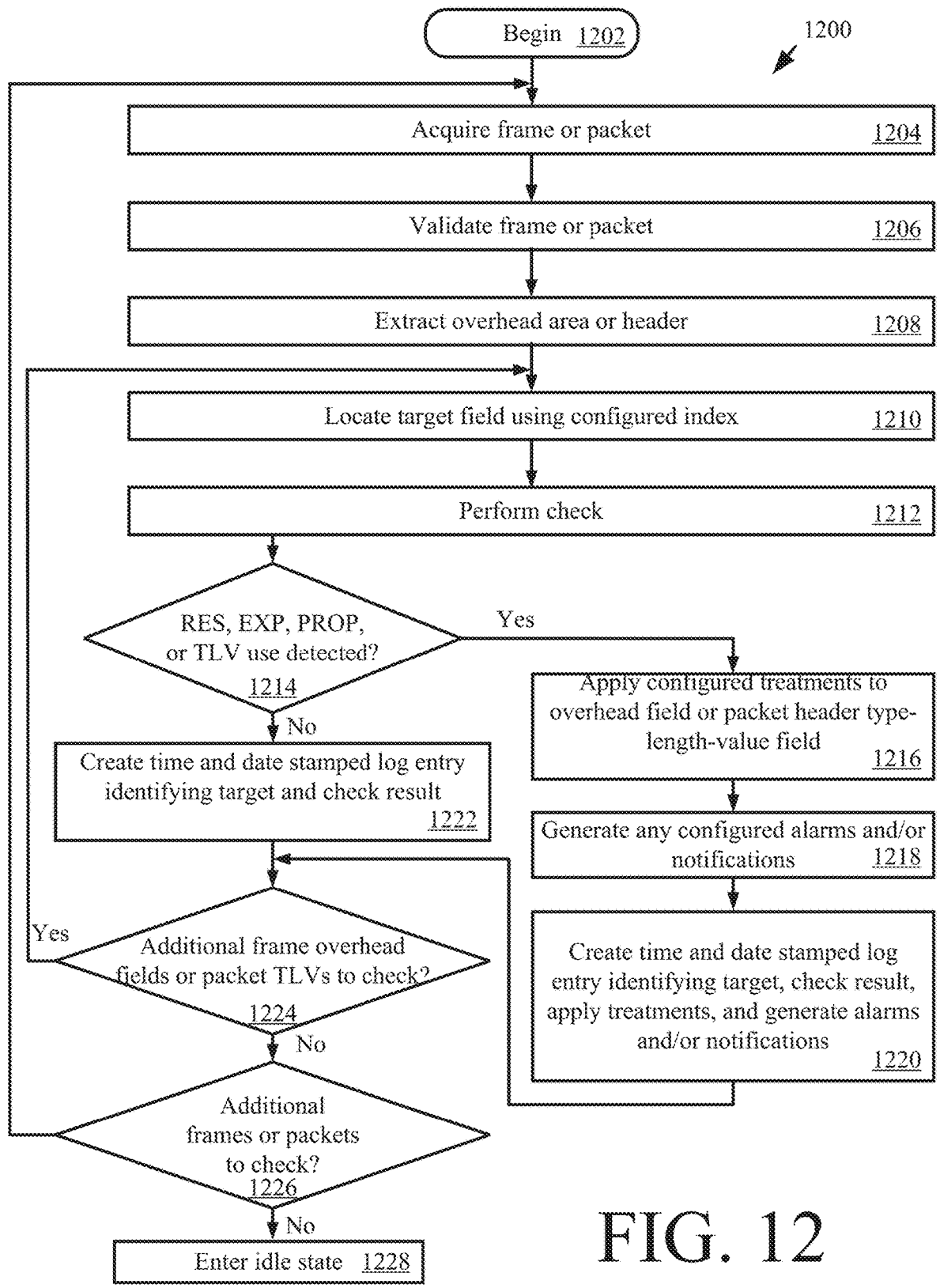

Once the system is configured via method 1100, the present solution is employed to improve network element security as shown by method 1200 of FIG. 12. Method 1200 begins with 1202 and continues with 1204 where a frame or packet is acquired. Method 1200 continues with 1206-1212 where the following operations are performed: validating the frame or packet; extracting overhead area or header from the frame or packet; locating target field using configured index; and performing a check. In 1214, a decision is made as whether reserved overhead field value(s), experimental field value(s), proprietary field value(s) and/or unused field value (s) have been detected. If not [1214: NO], a time and date stamped log entry is created in 1222 that identifies a target. The result is also checked in 1222. Thereafter, the operations of 1224-1228 are performed which will be described below.

If so [1214: YES], method 1200 continues with 1216-1220 where the following operations: applying configured treatments to overhead field or packet header Type-Length-Value (TLV) field; generating any configured alarms and/or notifications; creating time and date stamped log entry identifying target; checking result; applying treatments; and generating alarms and/or notifications. Upon completing 1220, a decision is made in 1224 as to whether additional frame overhead filed and packet TLVs need to be checked. If so [1224: YES], method 1200 returns to 1210. Otherwise [1224: NO], a decision is made in 1226 as to whether additional frames or packets need to be checked. If so [1226: YES], then method 1200 continues with 1204. Otherwise [1226: NO], the system enters an idle state as shown by 1228.

Figure 13:
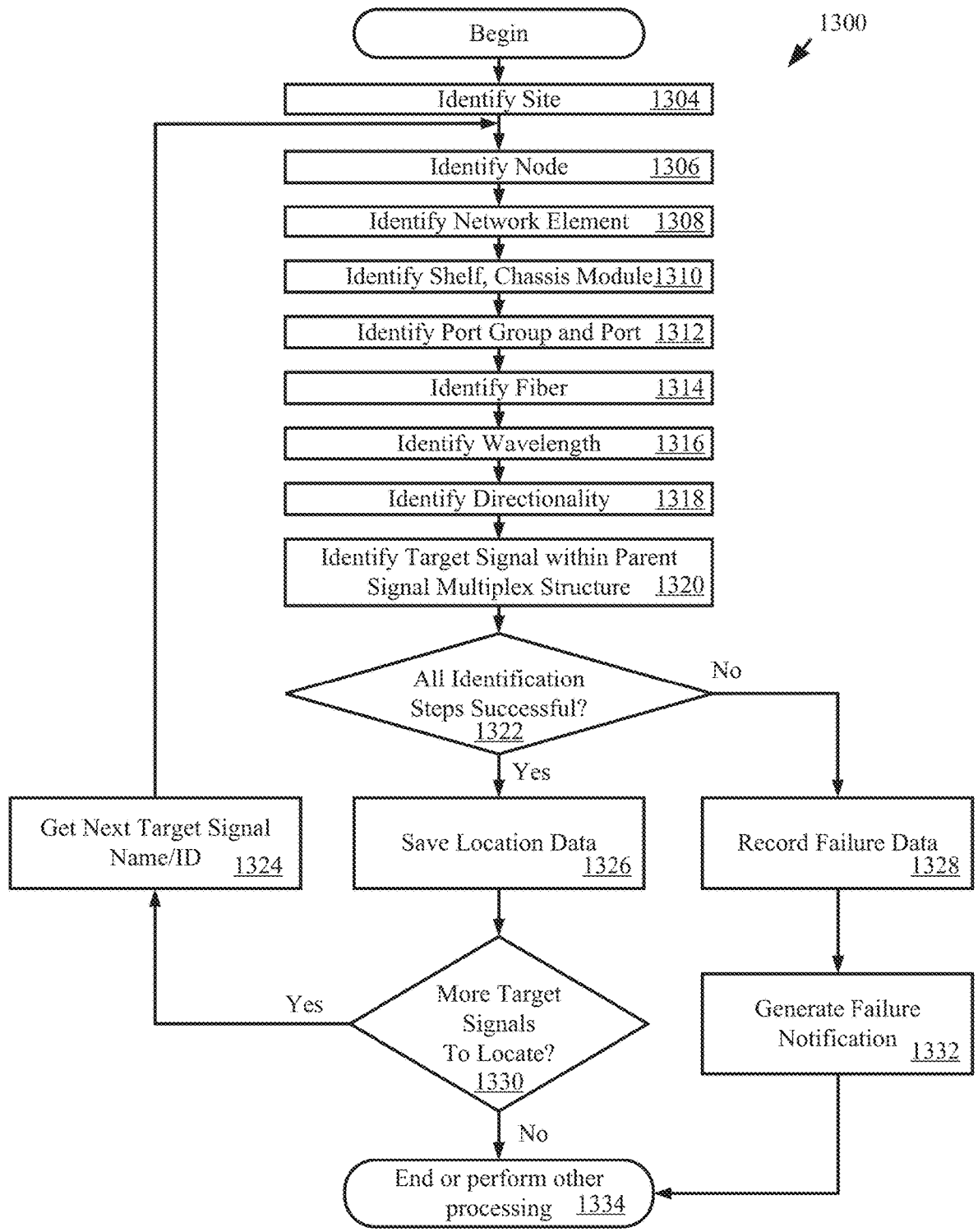

FIG. 13 provides a more detailed flow diagram for the operations performed in block 1110 of FIG. 11. Multiple target signals may be configured and the target signal identification detail within the hierarchy of site, node, network element, module, port, etc. is complex.

As shown in FIG. 13, these operations involve those performed in blocks 1304-1320: identifying a site; identifying a node; identifying a network element; identifying a shelf, chassis module; identifying a port group and port; identifying fiber; identifying wavelength; identifying directionality; and identifying target signal within parent signal multiplex structure. The directionality can include, but is not limited to, bidirectional, unidirectional (east to west) and/or unidirectional (west to east).

Thereafter, a decision is made in 1322 as to whether all identification steps were successful. If so [1322: YES], then method 1300 continues with another decision step in block 1330. The system determines whether there are more target signals to locate. If so [1330: YES], 1324 is performed where a next target signal name and/or identifier is/are obtained and the process returns to 1306. Otherwise [1330: NO], method 1300 ends or other operations are performed as shown by 1334.

If one or more of the identification steps was not successful [1322: NO], then 1328-1332 are performed which involve recording a failure and generating a failure notification. Subsequently, method 1300 ends or other operations are performed as shown by 1334.

Figure 14:
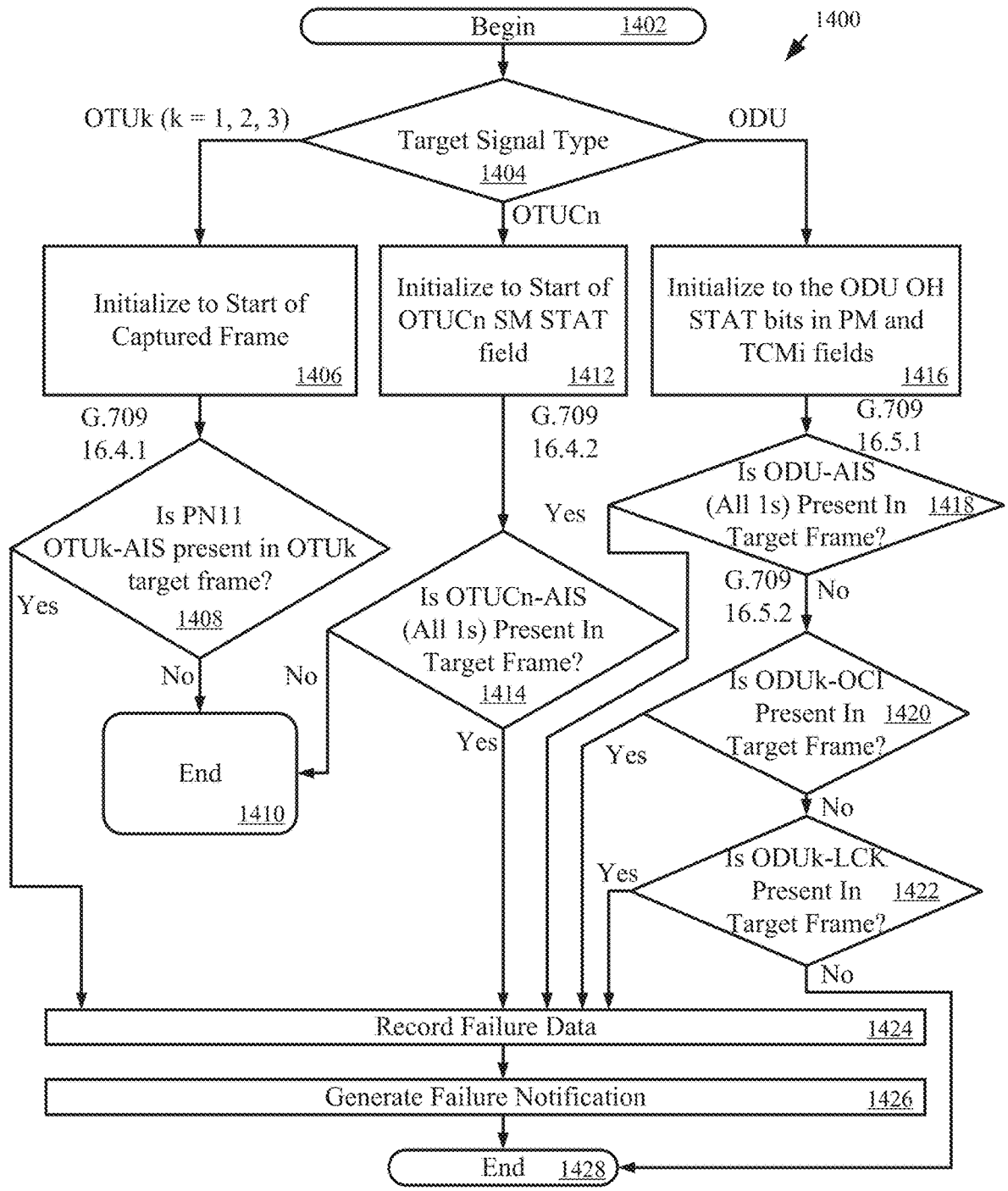

Referring now to FIG. 14, there is provided a flow diagram of a method 1400 to validate a target signal. Method 1400 begins with 1402 and continues with 1404 where a decision is made as to whether a target signal type is determined. In the case that an Optical Transport Unit of order k (e.g., 1, 2, 3, or 4) (OTUk) is determined, then method 1400 continues with 1406 where initialization operations are performed to start of captured frame. Next in 1408, a decision is made as to whether a PN11 OTUk Alarm Indication Signal (AIS) is present in an OTUk target frame. If not [1408: NO], then method 1400 ends as shown by block 1410. Otherwise [1408: YES], method 1400 continues with 1424-1426 which involve recording failure data and generating failure notification(s). Subsequently, method 1400 ends as shown by block 1428.

In the case of Optical Transport Unit—Cn (OTUCn), method 1400 continues with 1412 where initialization operations are performed to start of OTUCn Section Monitoring (SM) status (STAT) field. Next in 1414, a decision is made as to whether an OUT-Cn AIS is present in a target frame. If not [1414: NO], then method 1400 ends as shown by block 1410. Otherwise [1414: YES], method 1400 continues with 1424-1426 which involve recording failure data and generating failure notification(s). Subsequently, method 1400 ends as shown by block 1428.

In the case of Optical Data Unit (ODU), method 1400 continues with 1416 where initialization operations are performed to the ODU OH STAT bits in Path Monitoring (PM) and Tandem Connection Monitoring (TCMi) fields. Next in 1418-1422, the following decisions are made: whether an ODU AIS is present in a target frame; whether an ODU of order k (ODUk) Open Connector Indicator (OCI) is present in a target frame; and whether and ODUk Locked Indication (LCK) is present in the target frame. If not [1418: NO, 1420: NO and/or 1422: NO], then method 1400 ends as shown by block 1428. Otherwise [1418: YES, 1420: YES and/or 1422: YES], method 1400 continues with 1424-1426 which involve recording failure data and generating failure notification(s). Subsequently, method 1400 ends as shown by block 1428.

Figure 15:
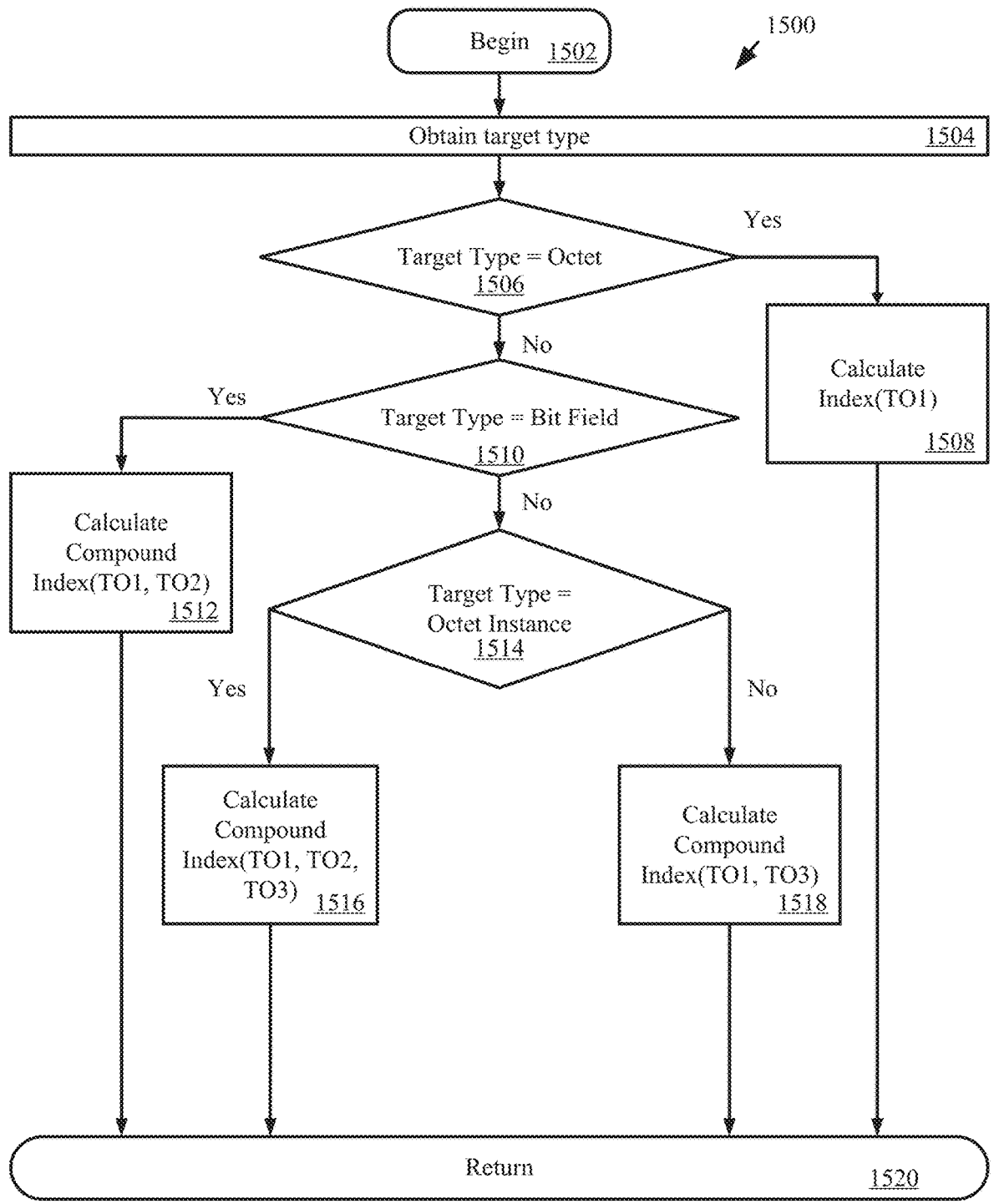
Figure 16:
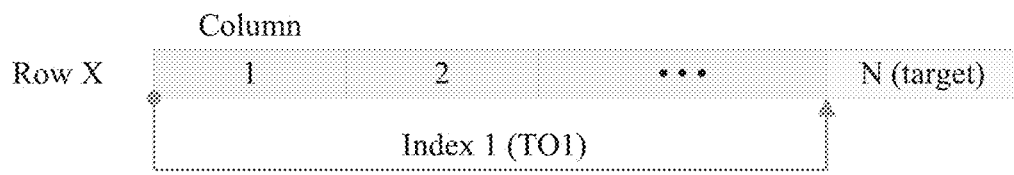
Figure 17:
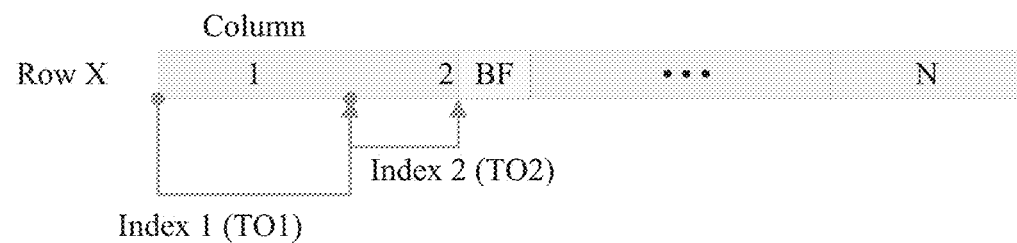

Referring now to FIG. 15, there is provided a flow diagram of a more detailed method 1500 for the operations performed in block 1122 of FIG. 11. Illustrations are provided in FIGS. 16-20 that are useful for understanding an implementation of method 1500.

As shown in FIG. 15, method 1500 begins with 1502 and continues with 1504 where a target type is obtained from a datastore. A decision is made in 1506 as to whether the target type is octet. If so [1506: YES], then an index (TO1) is calculated in block 1508 and the process returns as shown by block 1520. Otherwise [1506: NO], a decision is made as to whether the target type is a bit field. If so [1510: YES], then a compound index (TO1, TO2) is computed in block 1512 and the process returns as shown by block 1520. Otherwise [1510: NO], a decision is made in 1514 as to whether the target type is an octet instance. If so [1514: YES], a compound index (TO1, TO2, TO3) is computed in block 1516 and the process returns as shown by block 1520. Otherwise [1514: NO], a compound index (TO1, TO3) is computed in block 1518 and the process returns as shown by 1520.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. A method for improving network element security, comprising:
    obtaining a transport frame by a network element;
    analyzing, by the network element, the transport frame to determine whether or not any vulnerable overhead field values in at least one octet of a header of a mapping layer frame and overhead octets of a transport layer frame have values other than expected values;
    obtaining, by the network element, a policy or rule for processing the transport frame in response to a determination that at least one vulnerable overhead field value of the vulnerable overhead field values has a value other than the expected value;
    modifying, by the network element, at least one reserved target field value in the transport frame when a determination is made that the at least one vulnerable overhead field value has a value other than the expected value; and
    communicating, by the network element, the transport frame with the modified at least one reserved target value over a network or to a mapping layer formatting circuit;
    wherein the policy or rule requires that the network element ignore that a given vulnerable overhead field value of the vulnerable overhead field values has a value other than the expected value, and communicate the transport frame over a network when all other ones of the vulnerable overhead field values have the expected values.

2. The method according to claim 1, further comprising communicating the transport frame over a network when a determination is made that each of the vulnerable overhead field values has the expected value.

3. The method according to claim 1, wherein the policy or rule further requires that the at least one reserved target field value be set to the expected value, be set to zero, or be set to a pre-defined value for preventing an infiltration of a given network.

4. The method according to claim 1, wherein the policy or rule further requires that the network element issue an alarm or output a notification.

5. The method according to claim 1, wherein the policy or rule is selected based on a result from performance of a machine learning algorithm to detect a pattern of values in the vulnerable overhead field values in at least one of the header of the mapping layer frame and the header of the transport layer frame.

6. The method according to claim 5, wherein the result from the machine learning identifies at least one of a source of malicious activity or a type of malicious activity.

7. The method according to claim 1, wherein the mapping layer frame comprises a Generic Framing Procedure (GFP) frame, an Asynchronous Mapping Procedure (AMP) frame, a Bit-synchronous Mapping Procedure (BMP) frame, Generic Mapping Procedure (GMP) or an Idle Mapping Procedure (IMP) frame.

8. The method according to claim 1, wherein the transport layer frame comprises an Optical Transport Network (OTN) frame, a Synchronous Digital Hierarchy (SDH) network frame, or a Synchronous Optical Network (SONET) frame.

9. A system, comprising:
    a processor;
    a non-transitory computer-readable storage medium comprising programming instructions that are configured to cause the processor to implement a method for improving network element security, wherein the programming instructions comprise instructions to:
    obtain a transport frame;
    analyze the transport frame to determine whether or not any reserved overhead field values in at least one of a header of a mapping layer frame and a header of a transport layer frame have values other than expected values;
    obtain a policy or rule for processing the transport frame in response to a determination that at least one vulnerable overhead field value of the vulnerable overhead field values has a value other than the expected value;
    modify at least one reserved target field value in the transport frame when a determination is made that the at least one reserved overhead field value has a value other than the expected value; and
    communicate the transport frame with the modified at least one reserved target value over a network or to a mapping layer formatting circuit;

wherein the policy or rule requires that the network element ignore that a given vulnerable overhead field value of the vulnerable overhead field values has a value other than the expected value, and communicate the transport frame over a network when all other ones of the vulnerable overhead field values have the expected values.

10. The system according to claim 9, wherein the programming instructions comprise instructions to communicate the transport frame over a network when a determination is made that each of the vulnerable overhead field values has the expected value.

11. The system according to claim 9, wherein the policy or rule further requires that the at least one reserved target field value be set to the expected value, be set to zero, or be set to a pre-defined value for preventing an infiltration of a given network.

12. The system according to claim 9, wherein the policy or rule further requires that the network element issue an alarm or output a notification.

13. The system according to claim 9, wherein the policy or rule is selected based on a result from performance of a machine learning algorithm to detect a pattern of values in the vulnerable overhead field values in at least one of the header of the mapping layer frame and the header of the transport layer frame.

14. The system according to claim 13, wherein the result from the machine learning identifies at least one of a source of malicious activity or a type of malicious activity.

15. The system according to claim 9, wherein the mapping layer frame comprises a Generic Framing Procedure (GFP) frame, an Asynchronous Mapping Procedure (AMP) frame, a Bit-synchronous Mapping Procedure (BMP) frame, Generic Mapping Procedure (GMP) or an Idle Mapping Procedure (IMP) frame.

16. The system according to claim 9, wherein the transport layer frame comprises an Optical Transport Network (OTN) frame, a Synchronous Digital Hierarchy (SDH) network frame, or a Synchronous Optical Network (SONET) frame.

\* \* \* \* \*